United States Patent [19]

Kruithoff

[11] Patent Number: 4,753,296

[45] Date of Patent: Jun. 28, 1988

[54] VEGETABLE HARVESTER

[76] Inventor: David M. Kruithoff, Rte. 2 & 40th Ave., Lakeview, Mich. 48850

[21] Appl. No.: 778,799

[22] Filed: Sep. 23, 1985

[51] Int. Cl.[4] .......................................... A01D 27/02
[52] U.S. Cl. ....................................... 171/26; 171/17; 198/493; 406/79; 406/82
[58] Field of Search ................... 171/12, 17, 24, 31, 171/42, 131, 41, 36, 26; 99/636, 639, 643; 172/4; 406/77, 79, 82; 198/493, 642; 83/14

[56] References Cited

U.S. PATENT DOCUMENTS

| 926,286 | 6/1909 | Petrie | 83/100 X |
|---|---|---|---|
| 1,246,110 | 11/1917 | Killingsworth | 99/636 |
| 1,246,935 | 11/1917 | Killingsworth | 99/636 |
| 1,256,023 | 2/1918 | Killingsworth | 99/643 |
| 1,347,733 | 7/1920 | Davis | 56/158 |
| 1,396,080 | 11/1921 | Wolfe | 83/402 X |
| 1,489,061 | 4/1924 | Burdick | 171/36 X |
| 1,565,648 | 12/1925 | Hoyt | 99/643 |
| 1,610,358 | 12/1926 | Caller | 406/77 |
| 1,683,024 | 9/1928 | Climer | 99/643 |
| 1,744,251 | 1/1930 | Urschel | 99/639 |
| 1,875,072 | 8/1932 | Maryott | 171/17 |
| 1,913,837 | 6/1933 | Haynes | 99/643 |
| 2,553,519 | 5/1951 | Lenz | 171/17 |
| 2,579,013 | 12/1951 | Sampson | 171/42 |
| 2,625,781 | 1/1953 | Tateyama | 171/34 |
| 2,693,069 | 11/1954 | Krier | 171/34 |
| 3,163,234 | 12/1964 | Boyer | 171/17 |
| 3,285,306 | 11/1976 | Wetzel | 171/17 X |
| 3,286,774 | 11/1966 | Lorenzen et al. | 171/27 X |
| 3,302,727 | 2/1967 | Ray | 99/643 |
| 3,579,909 | 8/1971 | Lauridson et al. | 171/36 X |
| 3,596,716 | 8/1971 | Hoffman | 171/17 |
| 3,638,697 | 2/1972 | Krekelberg | 99/639 X |
| 3,646,978 | 3/1972 | Tait | 99/639 |
| 3,677,315 | 7/1972 | Cox | 99/643 X |
| 3,952,646 | 4/1976 | Leban | 99/639 |
| 4,044,838 | 8/1977 | Wooldridge | 172/4 X |
| 4,174,001 | 11/1979 | Ellis | 171/17 |
| 4,175,621 | 11/1979 | Seem | 171/14 |
| 4,176,721 | 12/1979 | Poggemiller et al. | 172/4 |
| 4,373,589 | 2/1983 | Hagiz | 171/31 |

FOREIGN PATENT DOCUMENTS

| 2701117 | 7/1978 | Fed. Rep. of Germany | 172/4 |
|---|---|---|---|
| 52358 | 11/1941 | Netherlands | 171/36 |
| 6904541 | 9/1970 | Netherlands | 99/636 |
| 1203762 | 9/1970 | United Kingdom | 171/17 |
| 204803 | 1/1968 | U.S.S.R. | 99/643 |
| 437499 | 12/1974 | U.S.S.R. | 171/26 |

Primary Examiner—Robert A. Hafer
Assistant Examiner—Samuel Rimell
Attorney, Agent, or Firm—Price, Heneveld, Cooper, DeWitt & Litton

[57] ABSTRACT

The specification discloses an apparatus for harvesting vegetables such as onions, including a topping plenum and a root cutting bed. Onions are removed from the ground by a self-adjusting digger conveyor which conveys them to an elevator conveyor. The elevator conveyor rises steeply over the large diameter, wide tires which convey the apparatus through the field. From thence the onions are conveyed beneath a vacuum plenum through a first air flow zone which is baffled so that the air flow is just sufficient to raise the tops of the onions off the conveyor and then through a second air flow zone where the onions are actually lifted off the conveyor and into registry with a registering and cutting means which cuts the tops off the onions. From thence they drop onto a root cutting bed which removes the roots of the onions and conveys them to a bulk loading conveyor. Dirt and offal drawn into the vacuum fan are conveyed out of the vacuum fan housing by a continuous conveyor system.

62 Claims, 15 Drawing Sheets

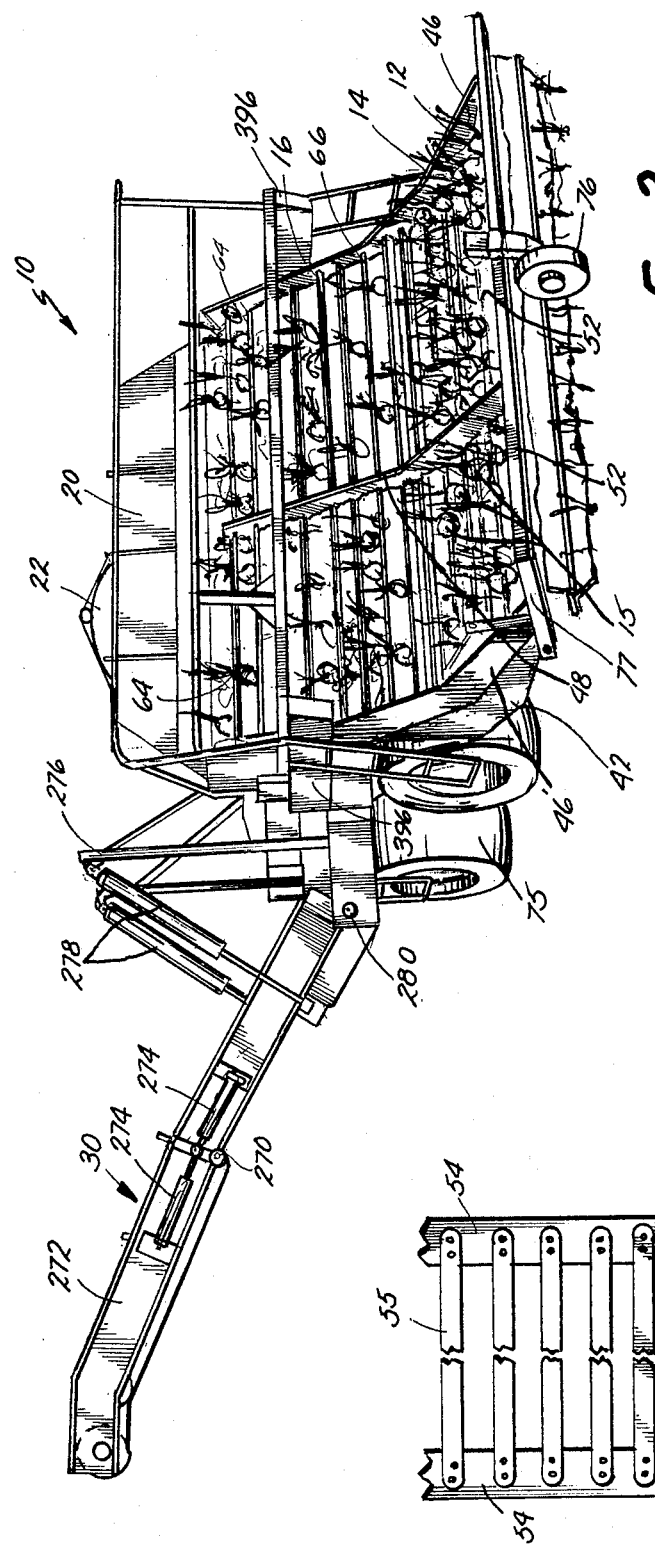

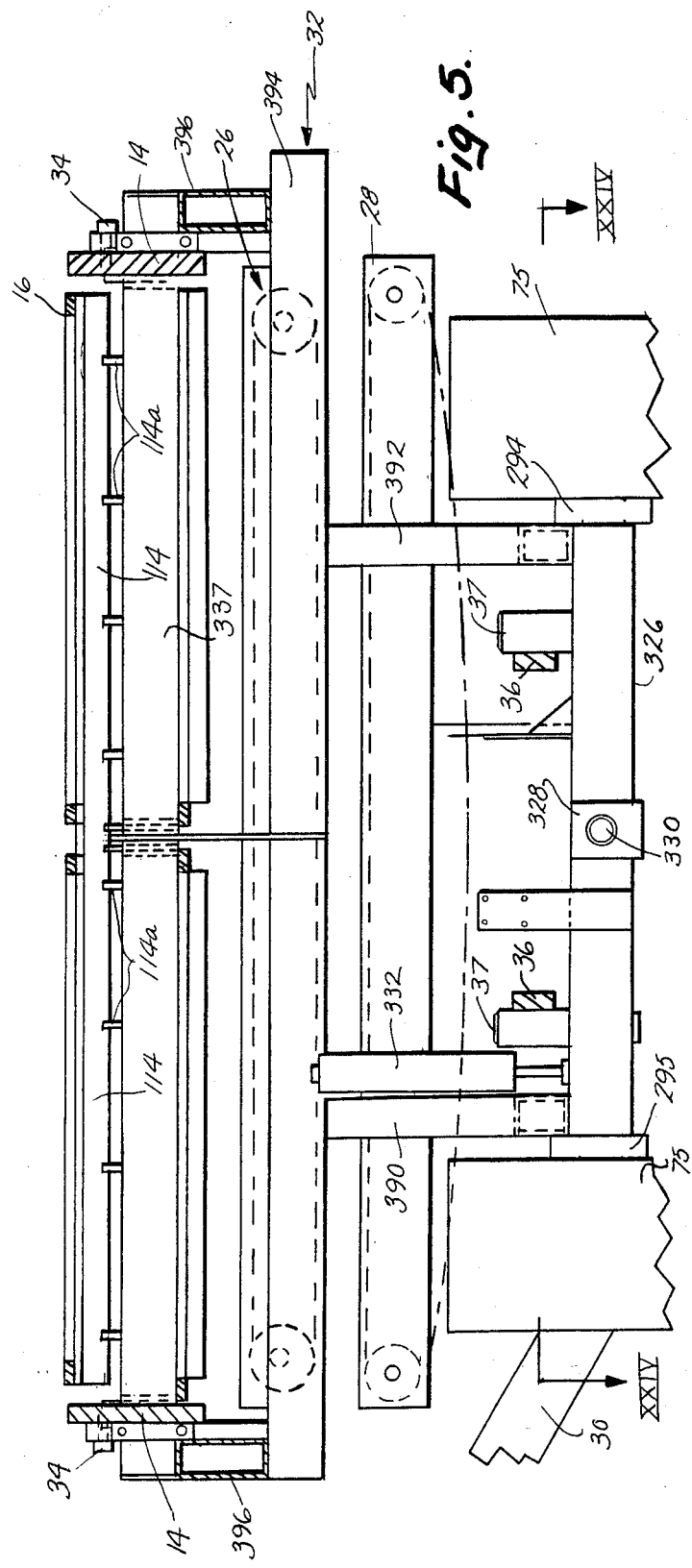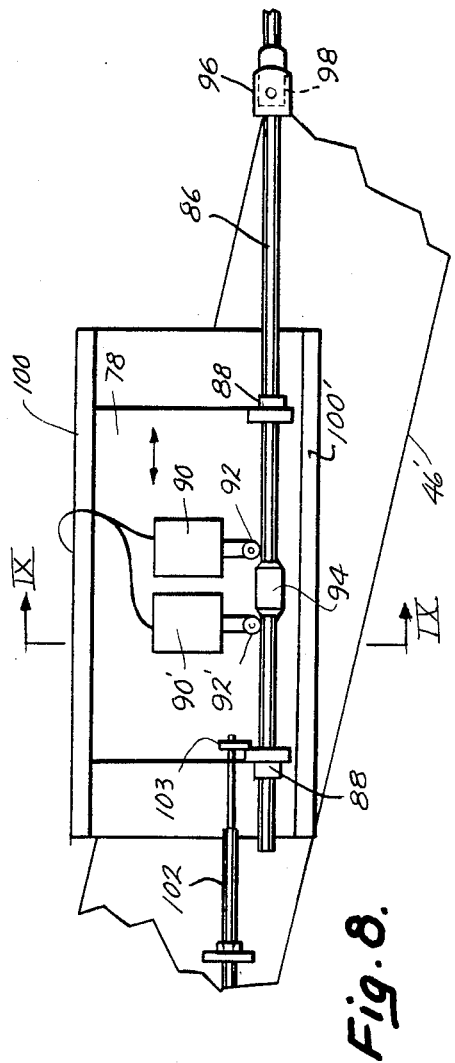

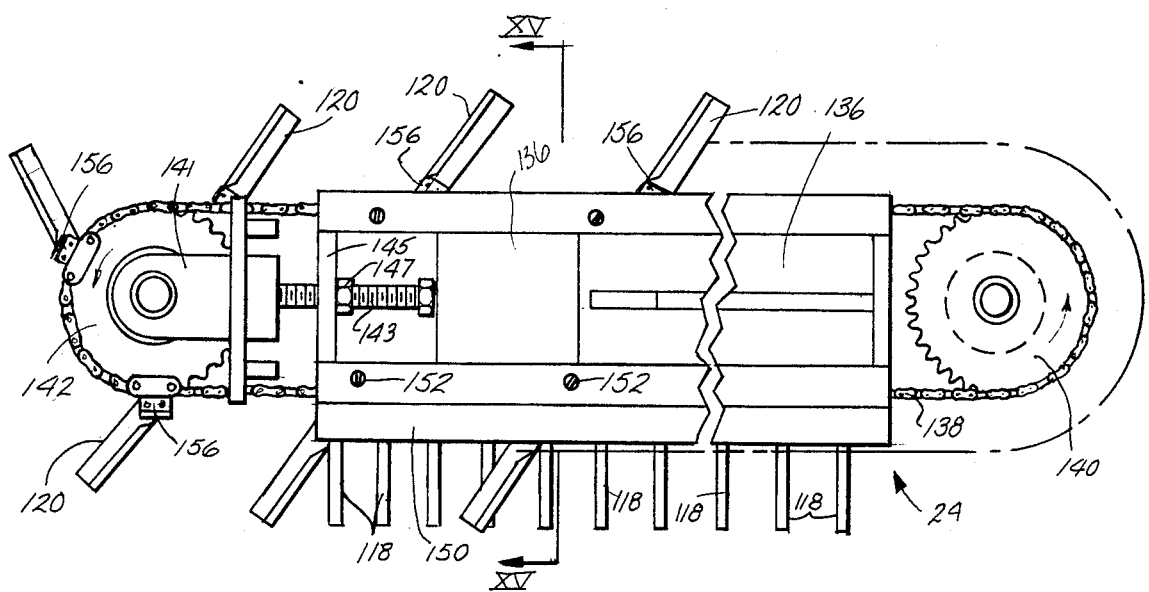
Fig. 13.
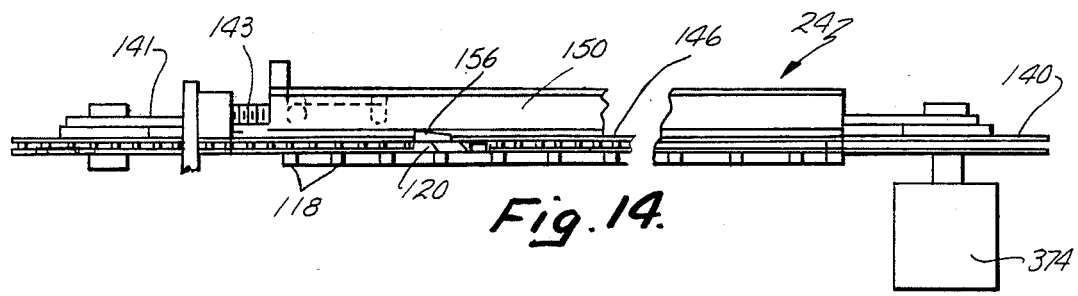
Fig. 14.
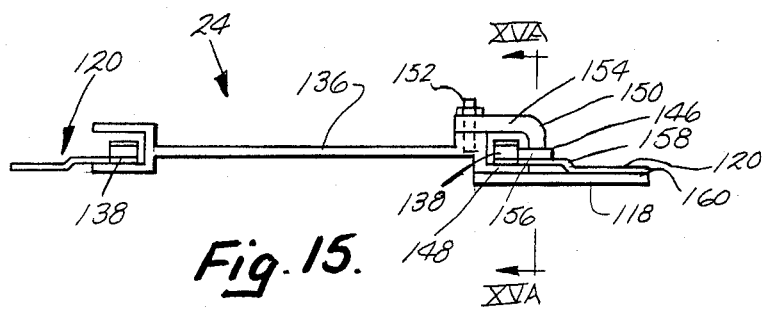
Fig. 15.
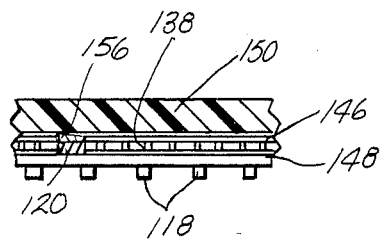
Fig. 15.A.

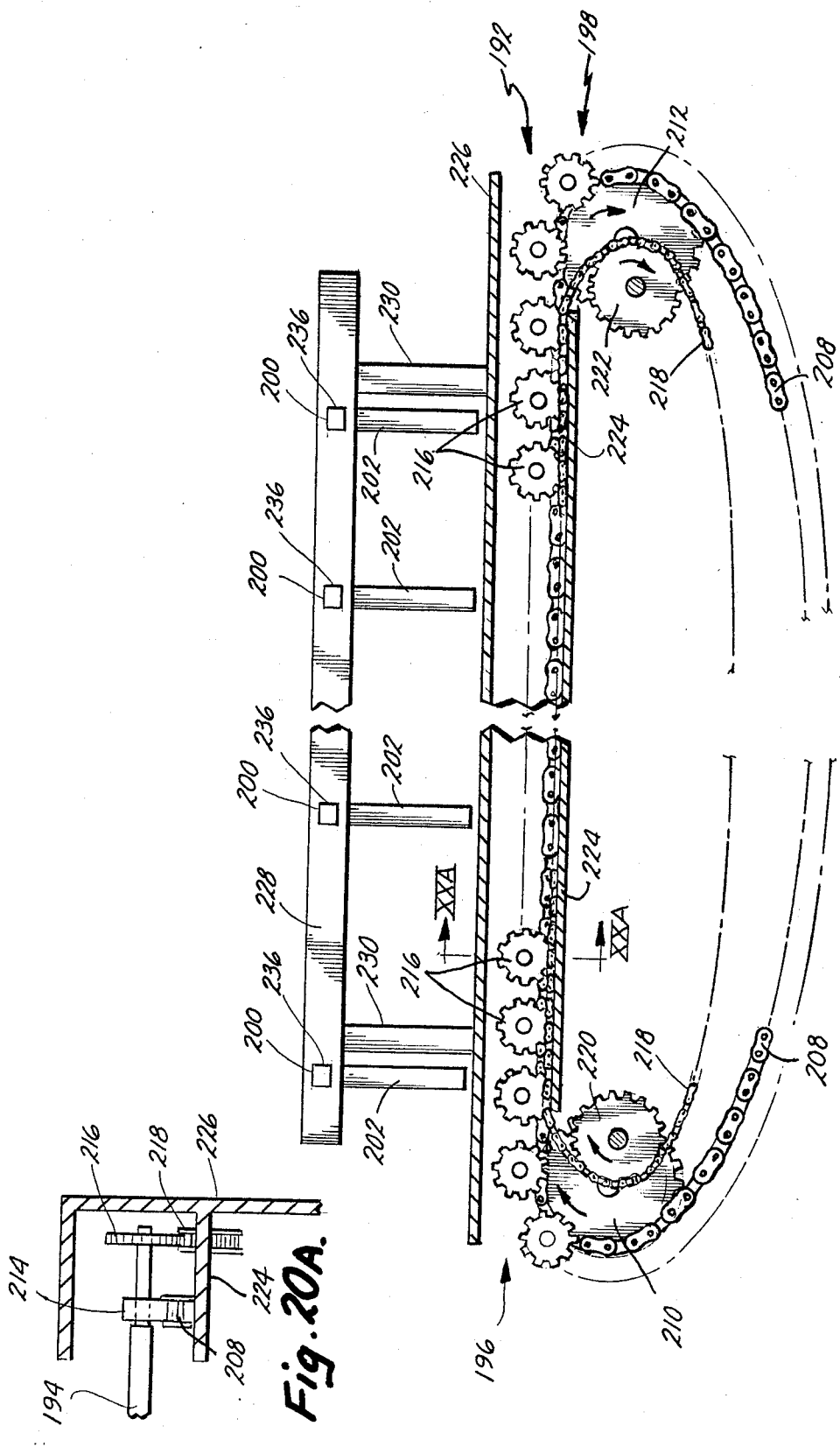

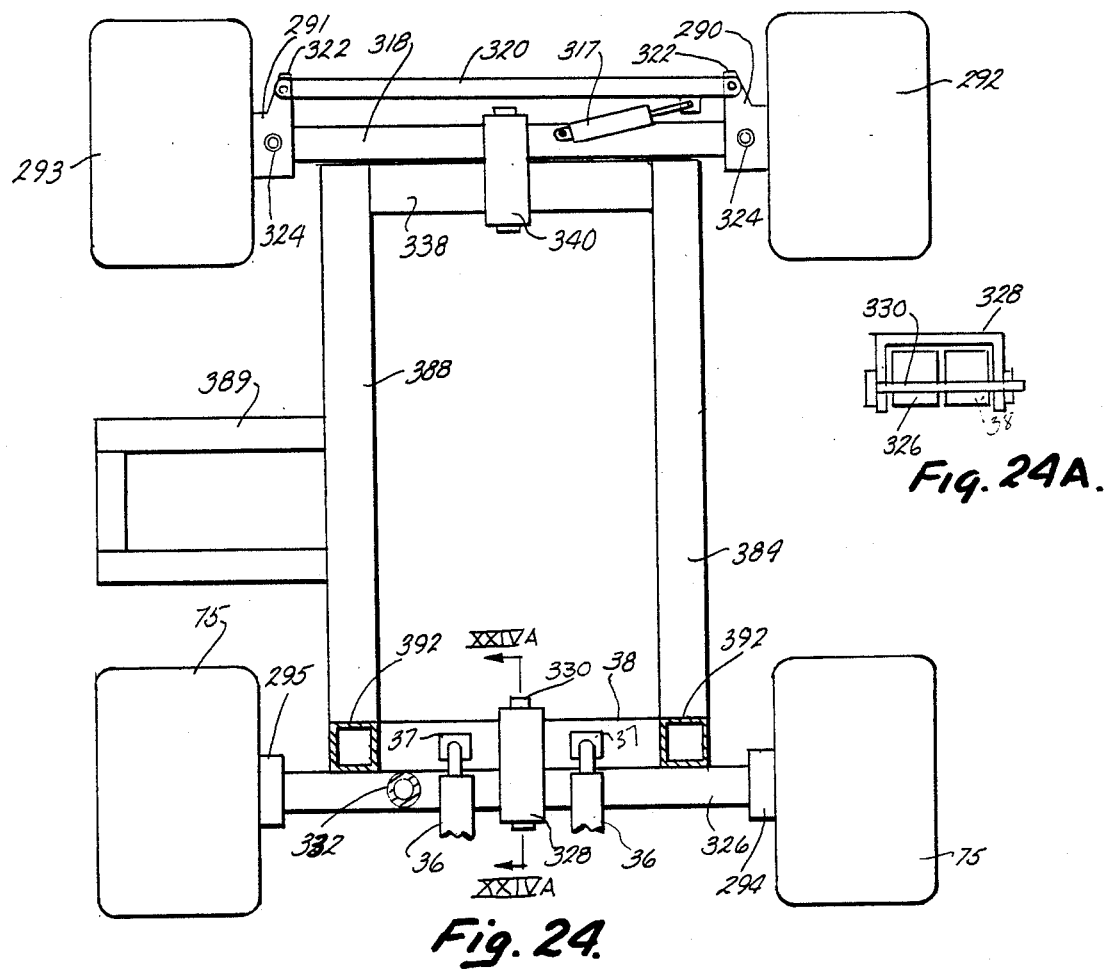
Fig. 24.
Fig. 24A.
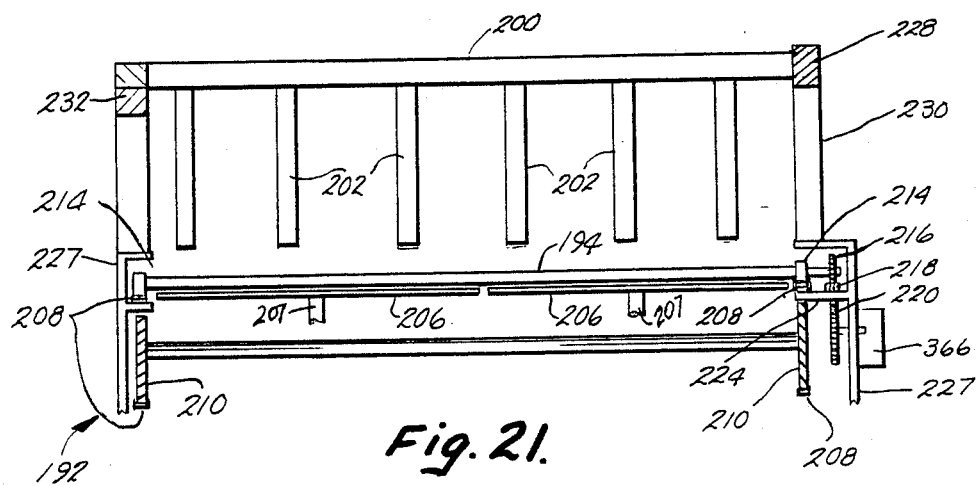
Fig. 21.

VEGETABLE HARVESTER

BACKGROUND OF THE INVENTION

The present invention relates to vegetable harvesters, and especially to such harvesters adapted to harvest vegetables with appendages, such as onions. These appendages must be removed in harvesting.

No prior art onion harvester has achieved any significant degree of success. One machine which has achieved some commercial use is sold by Air-Flo Clipper Manufacturing Company, Inc. It is a machine which has to be pulled by a tractor. It digs a row of onions, and employs a large blower to blow the tops of the onions upwardly as they pass over the blower. The tops, being resistant to air flow, are lifted by the blower. They then pass beneath an oscillating type cutter which cuts the tops.

Unfortunately, onions do not all grow to the same size. As a result, they are topped unevenly in this device. Also, this device works satisfactorily only on onions grown in climates where the top can be dried out prior to harvest- ing.

In hot, sunny climates, the tops of the onions cannot be dried before harvesting. They must be harvested green. As a result, the tops of these onions are very full and bushy. It is difficult to blow these tops upright and clip them because they are so full.

Onions grown in such climates also have to develop large root systems. The Air-Flo machine makes no provision for eliminating the roots on these onions. The roots cannot be lifted by a flow of air since they are not sufficiently resistant to air flow.

A large pull type machine was developed in Israel in an attempt to harvest such onions. The user had to do a number of separate operations in order to use this harvester. First the onions had to be dug and left laying in the field. Then four rows had to be windrowed. Finally, the machine was pulled again through the field to top the onions. This machine proved totally ineffective.

Consequently, most onions are harvested manually, especially in the hotter climates where most of the onions are grown.

SUMMARY OF THE INVENTION

The harvester of the present invention includes a number of novel and unobvious features which contribute to its success. Even topping of uneven onions is accomplished by conveying the onions through a first air flow zone in which sufficient air flow is generated to erect the tops of the onions and thence into a second zone of increased air flow which is sufficient to lift the onions against a register means generally adjacent to which the tops are cut. The onions then drop from the register means and are conveyed away from further processing.

These and other objects, advantages and features of the present invention will be more fully understood and appreciated by reference to the written specification and appended drawings.

BRIEF DESCRIPTION OF THE DRAWINGS

FIG. 2 is a right front perspective view of the onion harvester;

FIG. 5 is a cross section taken along the plane of line V—V of FIG. 4;

FIG. 8 is a fragmentary view of an adjustment mechanism for adjusting the digging depth of the digger chain conveyor into the ground;

FIG. 9 is a cross section taken along the plane of line IX—IX of FIG. 8;

FIG. 10 is a cross section taken along the plane of line X—X of FIG. 6;

FIG. 13 is a top plan view of the topping cutter of the present invention taken along the plane of line XIII—XIII of FIG. 11;

FIG. 14 is a front elevation of the topping cutter of the present invention;

FIG. 15 is a cross section taken along the plane of line XV—XV of FIG. 13;

FIG. 15a is a cross section taken along the plane of line XVa—XVa of FIG. 15

FIG. 20 is a cross section taken along the plane of line XX—XX of FIG. 19;

FIG. 20a is a fragmentary cross section taken along the plane of line XXA—XXA of FIG. 20;

FIG. 21 is a cross section taken along the plane of line XXI—XXI of FIG. 19;

FIG. 24 is a cross section taken along the plane of line XXIV—XXIV of FIG. 5;

FIG. 24a is a cross section taken along the plane of line XXIVa—XXIVa of FIG. 24;

DETAILED DESCRIPTION OF THE PREFERRED EMBODIMENT

I. Introduction

Figure 1:
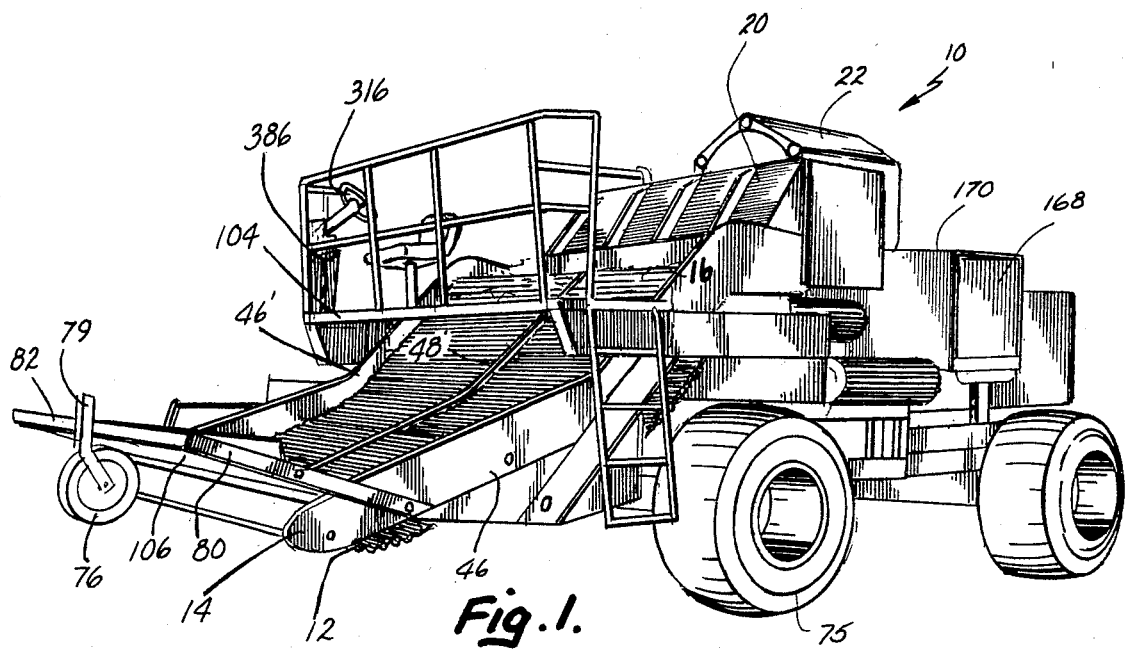
FIG. 1 is a left front perspective view of the onion harvester of the present invention.

In the preferred embodiment, the onion harvester 10 of the present invention includes a digger chain conveyor 12 supported on the lower end of a conveyor frame 14 for digging onions 15 from the ground (FIG. 2). The digger chain conveyor 12 unearths the onions after they have been "knifed" and carries the onions upwardly to an elevator conveyor 16 supported on conveyor frame 14 above digger chain conveyor 12. Elevator conveyor 16 receives onions from digger chain conveyor 12 and transports them underneath an opening 18 (FIG. 10) of a plenum 20 positioned above elevator conveyor 16. Opening 18 comprises a front portion 18a which is unobstructed and encompasses a first air flow zone. The rear portion of opening 18 is obstructed by a cutter assembly 24 which includes a register surface and which is located in a second air flow zone.

A vacuum induced by a vacuum fan 22 connected to plenum 20 draws the foliage of the onions upwardly into opening 18. At 18a, air flow is restricted by a baffle 114 under conveyor 16 and hence the onion tops merely stand erect. At cutter assembly 24 positioned at the rear edge 19 of opening 18, there is no flow restricting baffle and hence the onions are drawn up into registry with cutter 24 which cuts the foliage from the onions. The onion then drops back onto elevator conveyor 16 and is conveyed to and dropped onto an intermediate conveyor 26 (FIGS. 4, 10 and 18) which transports the onions to the infeed end of a rooting bed 28 which removes the roots and the remaining portion of the onion tops from the onions. The derooted and detopped onions are then fed onto a bulk loader conveyor 30 (FIGS. 2 and 3) which loads the onion bulbs onto a truck or other vehicle running alongside the onion harvester 10.

II. Digger And Elevator Conveyors

Figure 4:
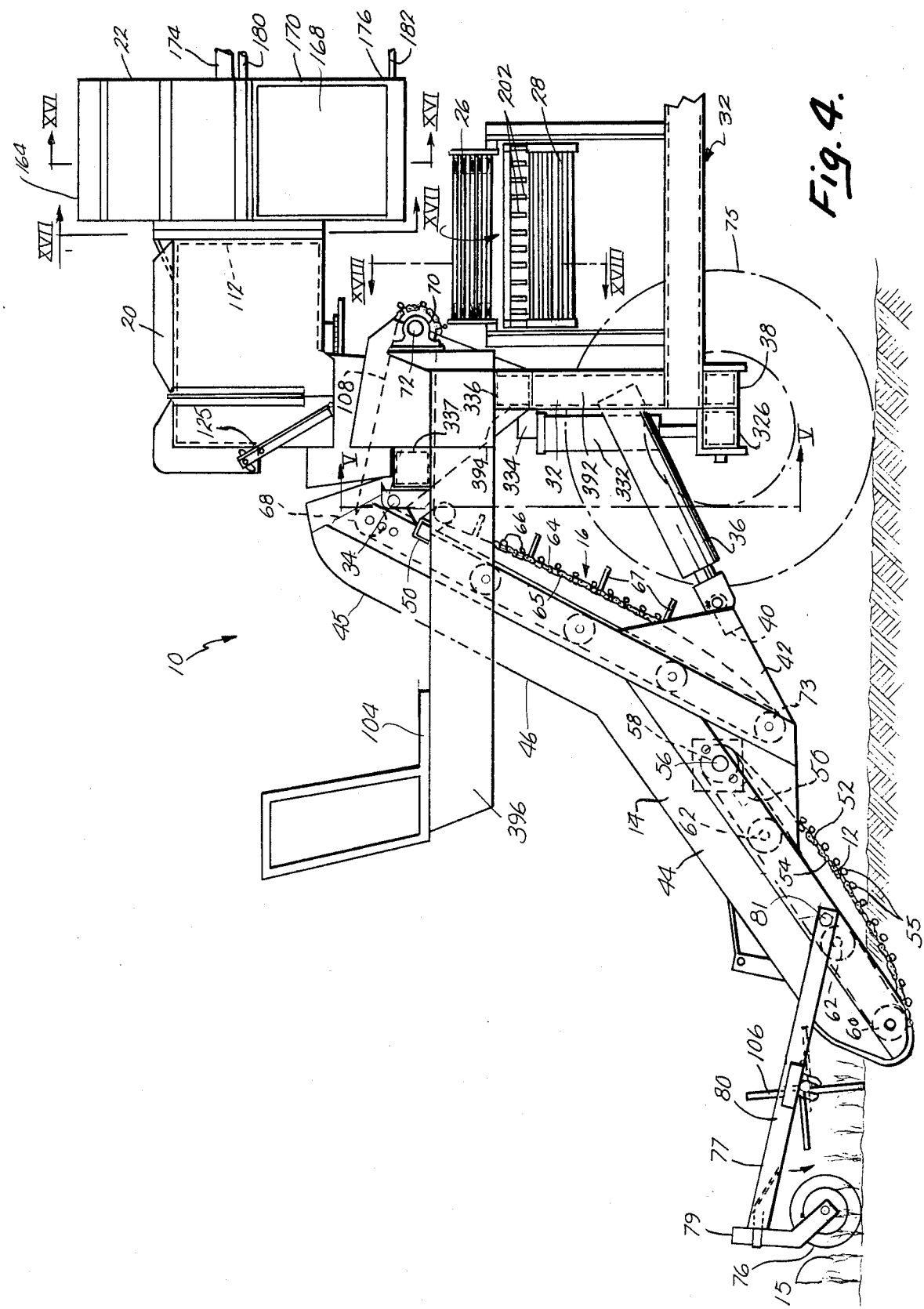
FIG. 4 is a detailed side elevation of the front left side of the onion harvester.

Conveyor frame 14 includes a lower frame portion 44 which supports digger chain conveyor 12 and an upper conveyor frame portion 45 which supports most of elevator conveyor 16 (FIGS. 4 and 10). The two conveyor frame portions 44 and 45 are rigidly secured to one another with the upper conveyor frame portion 45 inclined at a steeper angle than lower conveyor frame portion 44. Conveyor frame 14 includes two side frame members 46, 46' and an intermediate frame member 48 (FIGS. 2 and 6) each of which is shaped like an inverted chevron to provide the angle between lower conveyor frame portion 44 and upper conveyor frame portion 45. Gusset members 42 depend downwardly from side frame members 46, 46' (FIGS. 2 and 10). The side frame members 46, 46' and intermediate frame member 48 are interconnected by cross members 50 (FIGS. 4 and 6) and bar 40 to hold the three frame members parallel and in fixed position relative to one another.

As shown in FIGS. 4 and 5, conveyor frame 14 is pivotally connected to the front of the chassis 32 of the machine by pins 34 on either side of the upper end of conveyor frame 14. Conveyor frame 14 can be pivoted upwardly away from the ground or downwardly into the ground by hydraulic cylinders 36, each of which is mounted to a bracket 37 (FIGS. 5, 10) on the lower front crossbar 38 (FIGS. 4 and 24) of chassis 32 at one end and to a bar 40 (FIGS. 4 and 10) extending between two gusset members 42 attached to and extending downwardly from the sides of conveyor 14. Thus, as hydraulic cylinders 36 are extended, conveyor frame 14 will pivot upwardly so that digger chain conveyor 12 does not contact the ground. When hydraulic cylinders 36 are retracted, conveyor frame 14 pivots downwardly such that digger chain conveyor 12 digs into the ground and can uproot onions as the machine moves forwardly along the onion rows.

Figure 6:
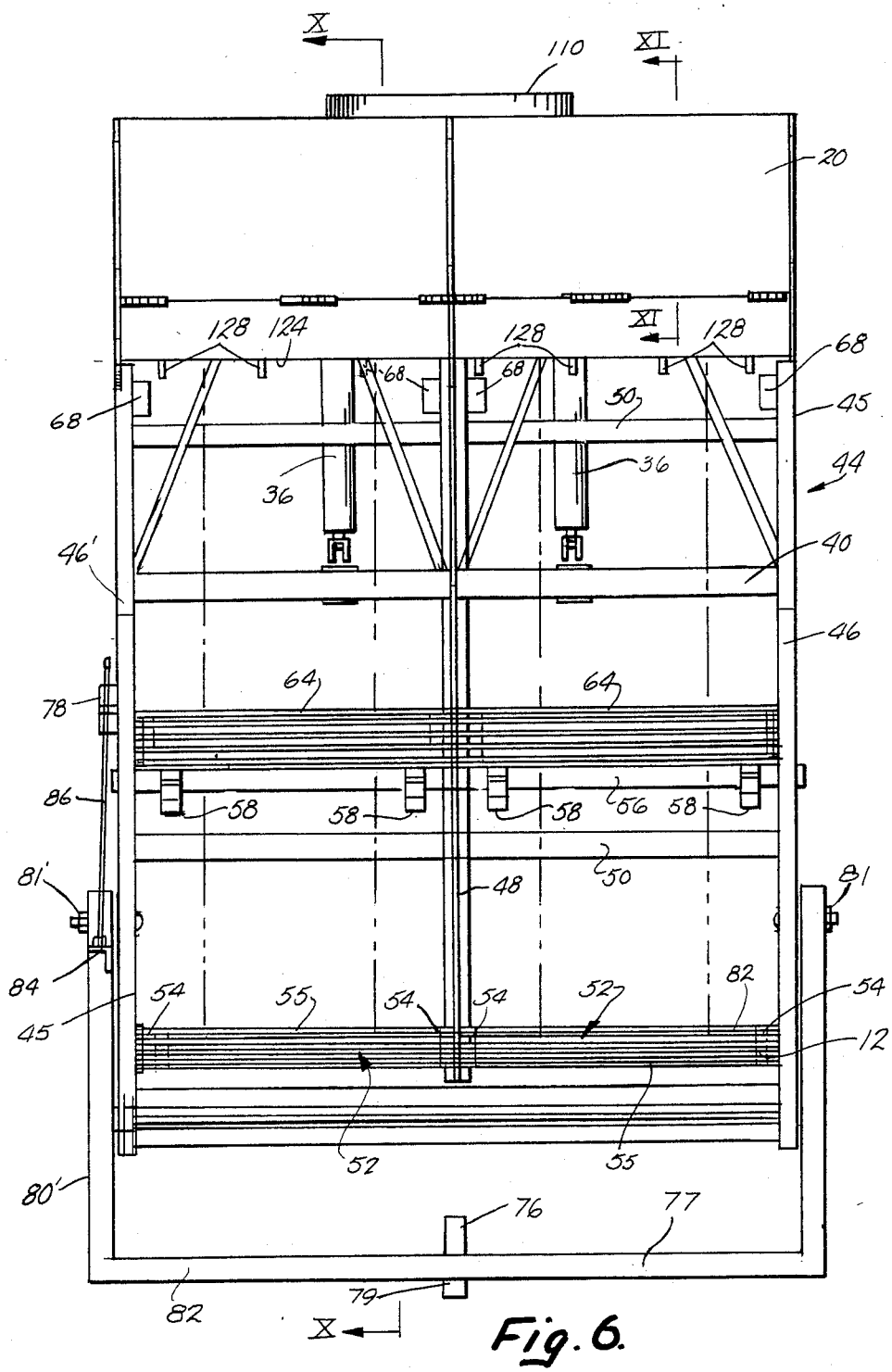
FIG. 6 is a top elevation of the front of the onion harvester of the present invention.
Figure 12:
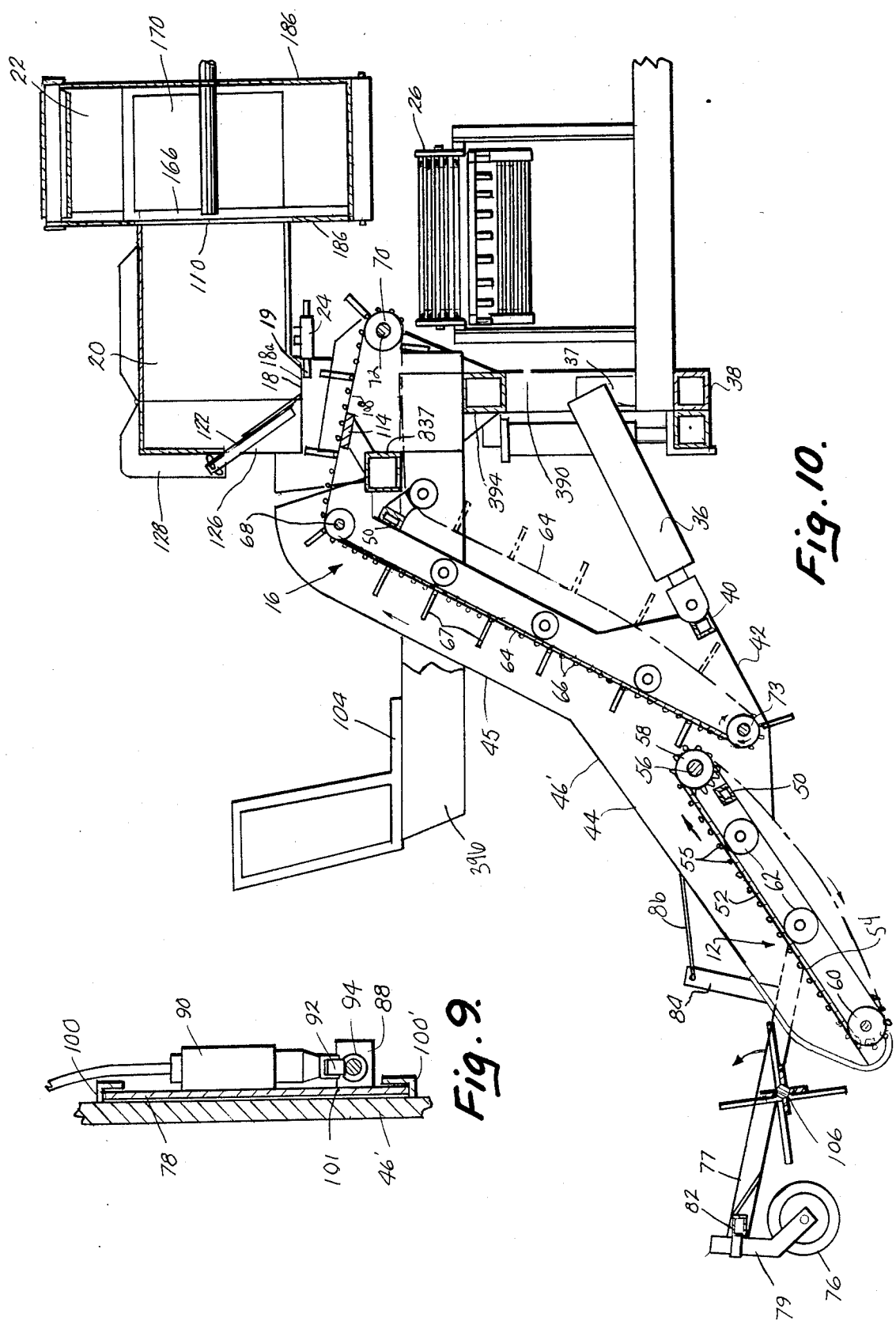
FIG. 12 is a fragmentary partially broken view of the conveyor chain construction used in the conveyors of the present invention.

Digger chain conveyor 12 includes two digger chains 52 each of which is positioned between one of the two side frame members 46 (or 46') and the intermediate frame member 48 (see FIGS. 2 and 6). Each digger chain 52 includes as shown in FIG. 12 an endless band 54 on either side of the chain with parallel bars 55 extending between the two bands. Bands 54 are made of a fiber reinforced polymeric material so that they are flexible. Bars 55 are made of steel and are riveted at their ends to the two bands 54. The space between any two of the parallel bars should be small enough to prevent onions from falling between the bars. Both digger chains 52 are driven by a hydraulically driven drive shaft 56 (FIGS. 4 and 10) which extends completely across the lower conveyor frame portion 44 from side frame member 46 to side frame member 46' through intermediate frame member 48. Drive shaft 56 includes four gears 58 which have teeth which mesh with bars 55 and grip the bars to drive digger chains 52 around drive shaft 56 as drive shaft 56 is rotated. Follower pulleys 60 (FIGS. 4 and 10) positioned along the lower ends of side frame members 46, 46' and intermediate frame member 48 support the lower ends of digger chains 52. Finally, support pulleys 62 are mounted on side frame members 46 and 46' and intermediate member 48 and positioned between follower pulley 60 and drive shaft 56 to support the upper sides of digger chains 52 to prevent the weight of the onions from sagging the upper sides of the digger chains.

Elevator conveyor 16 includes two side by side endless elevator chains 64, each of which is positioned between one of the side frame members (46 or 46') and intermediate frame member 48. Elevator chains 64 are identical in construction to digger chains 52 including endless side belts 65 and parallel bars 66 (FIGS. 4 and 10), with the exception that a plurality of paddles 67 are positioned spacedly around elevator chain 64 for carrying the onions up the steeply inclined angle at which the upper conveyor frame is oriented. Paddles 67 extend completely across each elevator chain 64 between the two side belts 65 on each chain.

Figure 11:
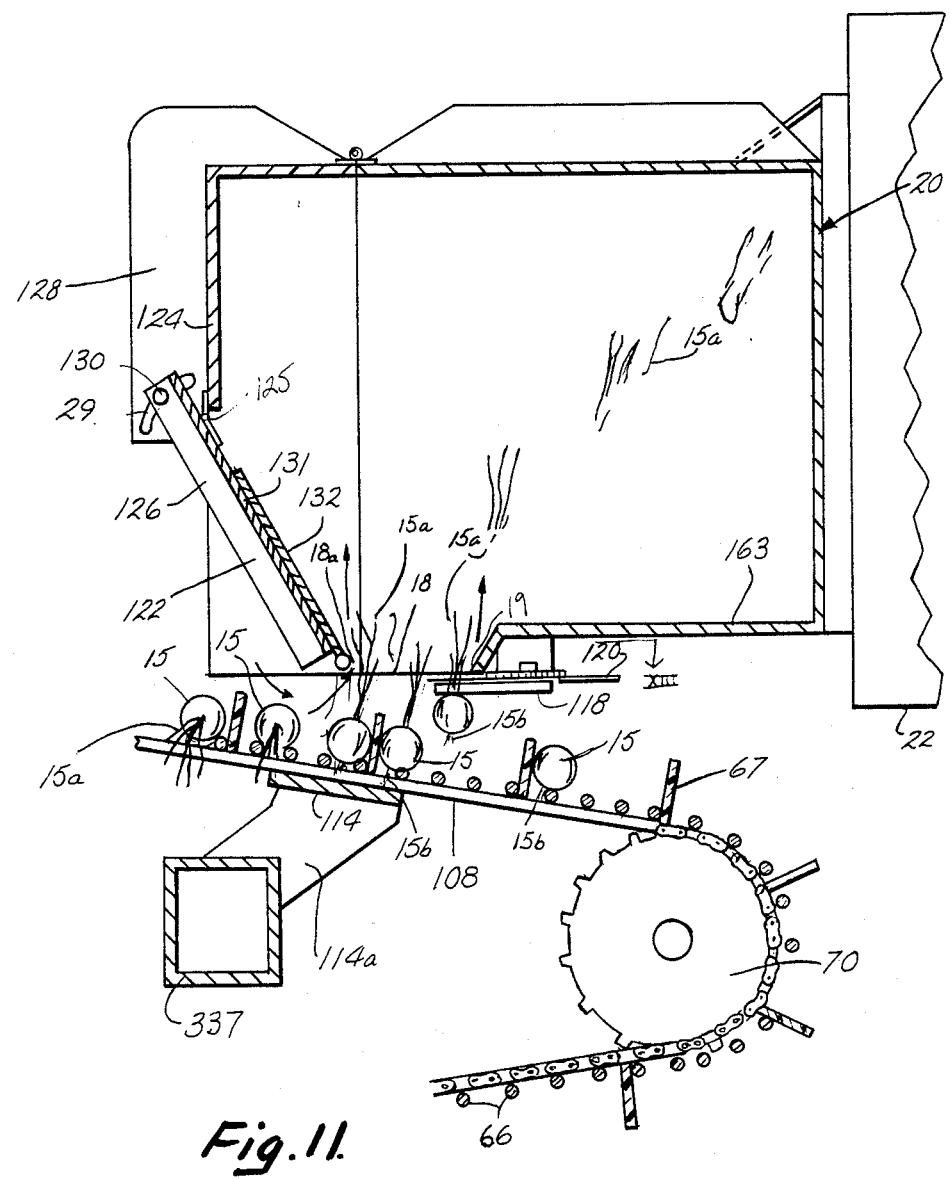
FIG. 11 is a cross section taken along the plane of line XI—XI of FIG. 6.

Elevator chains 64 extend underneath the upper ends of digger chains 52 so as to catch onions falling therefrom (FIGS. 4 and 10). From there the elevator chains travel upwardly to pulleys 68 (FIGS. 6 and 10) positioned at the upper ends of side frame members 46 and 46' and intermediate frame member 48. Thereafter, elevator chains 64 angle downwardly under plenum 20 and opening 18 to drive gears 70 (FIGS. 4, 10 and 11). Drive gears 70 are positioned on a drive shaft 72 which extends across the machine under plenum 20, drive shaft 72 being driven by a hydraulic motor (not shown). There are four drive gears 70, one on either side of each elevator chain 64. After going around gears 70, elevator chains 64 return forwardly underneath plenum 20 and downwardly below upper conveyor frame portion 45 to follower pulleys 73 (FIGS. 4 and 10) positioned underneath the upper ends of digger conveyor 12 and mounted on side frame members 46 and 46' and intermediate frame member 48.

A two level conveyor and digger arrangement is used because the chains or conveyors which dig into the earth are subjected to great wear. By making the digger chain conveyor 12 fairly short in length, only a comparatively short length of conveyor chain needs to be replaced in the event that it wears out as opposed to a long continuous chain extending from the lower end of conveyor frame 14 to the underside of plenum 20.

Additionally, elevator conveyor 16 is quite steep and extends to a sufficient height to allow the conveyor to pass completely over the front wheels 75 on which the machine rides. This allows the wheels to be located completely underneath and/or immediately behind the conveyor frame 14 so that wheels 75 do not extend laterally further than the sides of conveyor frame 14 and will not ride over ground planted with the onions. With the wheels behind the digger chain conveyor, the wheels will only travel over earth out of which onions have been extracted by the digger chain conveyor.

Further, digger conveyor 12 has to be inclined at a fairly shallow angle to the ground in order to dig properly. This angle should be less than 45 degrees and most preferably about 35 degrees. If it fed directly to topping plenum 20, it would either have to be extremely long, or wheels 75 would have to be quite small in diameter. By using a second elevator conveyor 16, one can give a very steep angle to conveyor 16 and thereby facilitate the placement of large diameter tires 75 immediately behind it. This angle is greater than 45 degrees, and preferably is about 65 degrees. The use of very wide, large diameter tires 75 on the front and similar sized tires 292 and 293 on the rear of the vehicle makes it possible to use the onion harvester in very soft, mucky fields or fields which have just been exposed to rain. Preferably, all four of the tires are about 31 inches wide and 48 inches in diameter.

III. Automatic Digging Depth Control

Figure 7:
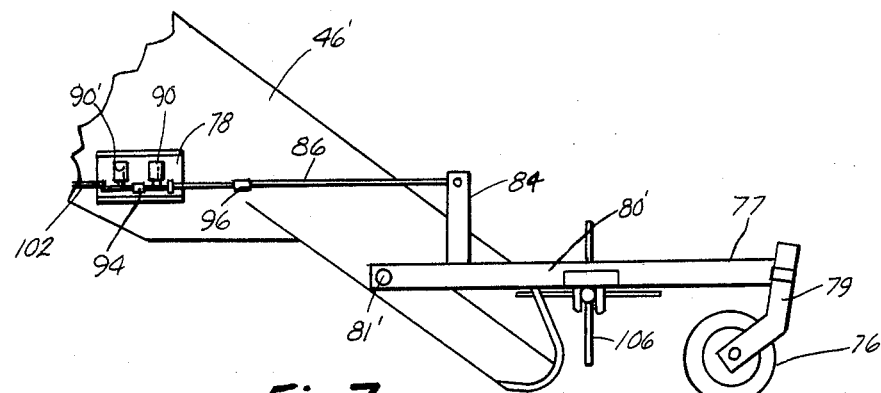
FIG. 7 is a side elevation of the front of the onion harvester of the present invention taken of the right side thereof.

The depth to which digger chain conveyor 12 extends into the earth while the machine is extracting onions is governed by the gauge wheel 76 and gauge wheel frame 77 (FIGS. 2, 4, 6, 7 and 10), as well as the switch plate 78 attached to side frame member 46'. As shown in FIGS. 4, 7 and 10, gauge wheel 76 rides along the surface of the ground in front of the machine and is supported by a bracket 79 which is connected to gauge wheel frame 77. Gauge wheel frame 77 is generally U-shaped and includes two side portions 80 and 80' which are pivotally connected to side frame members 46 and 46', at pivot points 81 and 81', respectively. A front portion 82 extends across the front of the machine is connected to gauge wheel bracket 79 and connects side portions 80 and 80'. It can be seen, therefore, that when the level of the ground rises and falls, gauge wheel frame 77 will pivot about pivot points 81 and 81' (FIG. 7).

An arm 84 (FIG. 7) extends vertically upwardly from side portion 80', and a control rod 86 pivotally connected to the upper end of arm 84 extends rearwardly toward and is supported by switch plate 78 mounted on side frame member 46'. As shown in FIGS. 8 and 9, the rear end of control rod 86 extends across switch plate 78 and is supported by two slide bearings 88 extending outwardly from the face of switch plate 78. Between slide bearings 88 mounted on switch plate 78 are located two microswitches 90 and 90' each of which has a roller 92 or 92' at its lower end contacting control rod 86 and being spacedly positioned from one another along control rod 86 as shown in FIG. 8. Located between slide bearings 88 on control rod 86 is an enlarged diameter portion or cam 94.

Normally, cam 94 is located between rollers 92 and 92'. However, when gauge wheel frame 77 pivots upwardly as the ground begins to rise in front of the machine, arm 84 will force control rod 86 rearwardly causing cam 94 to travel underneath and raise roller 92, actuating microswitch 90'. Conversely, if gauge wheel frame 77 pivots downwardly as the ground drops in front of the machine, arm 84 will pull control rod 86 forwardly such that cam 94 will slide underneath and raise roller 92, actuating microswitch 90. When microswitch 90' is actuated as the ground rises in front of the machine, it actuates a solenoid or the like to inject pressurized fluid into hydraulic cylinders 36 to raise conveyor frame 14 so that digger chain conveyor 12 is not digging too deeply into the ground rising in front of the moving machine. As conveyor frame 14 is raised upwardly by hydraulic cylinders 36, gauge wheel frame 77 will pivot downwardly relative to conveyor frame 14 about pivot points 81 and 81' so that arm 84 will pull control rod 86 forwardly to disengage cam 94 from roller 92', deactivating switch 90' and stopping the injection of fluid into hydraulic cylinders 36. Once the desired or appropriate digging depth is reached, therefore, conveyor frame 14 will stop its upward movement.

Conversely, when the ground begins to drop in front of the machine as it moves across the field, gauge wheel 77 will pivot downwardly and pull control rod 86 forwardly such that cam 94 slides underneath and raises roller 92, actuating microswitch 90. When this happens, microswitch 90 actuates a solenoid which releases fluid from hydraulic cylinders 36 thereby lowering conveyor frame 14 such that the digger chain conveyor can follow the contour of the sloping ground. When the end of the digger chain conveyor reaches the proper depth in the sloping ground, conveyor frame 14 will have pivoted downwardly such that cam 94 will have moved rearwardly from underneath roller 92, deactivating switch 90. Thus, it can be seen that cam 94 will always tend toward the neutral position between rollers 92 and 92', this neutral position being governed by the desired depth of penetration of the end of digger chain conveyor 12 into the ground.

This desired digging depth is controlled in two ways. First, the length of control rod 86 can be increased or decreased slightly by a turnbuckle 96 (FIG. 8) which also includes a pivotal joint 98 which accommodates different angular positions of arm 84 as it is pivoted. By increasing the length of control rod 86, the digging depth of the digger chain conveyor is decreased because gauge wheel frame 77 will be pivoted further downwardly relative to conveyor frame 14 to hold cam 94 in the neutral position. The converse is true. When control rod 86 is contracted in length, the digging depth of digger chain conveyor 12 is increased because gauge wheel frame 77 will be pivoted further upwardly relative to conveyor frame 14 to hold cam 94 in the neutral position.

The other way in which the digging depth is adjusted is by adjusting the position of switch plate 78. As shown in FIGS. 8 and 9, switch plate 78 is slidably received between two parallel horizontal guide rails 100 and 100' attached to side member 46', above and below switch plate 78, forming a channel 101 in which the switch plate is slidable. A Bowden cable 102 is anchored to a tab 103 which extends outwardly from switch plate 78. The operator of the machine sitting on the bridge 104 can activate a lever connected to the other end of Bowden cable 102 and adjust the position of switch plate 78 by sliding it within channel 101. If switch plate 78 is moved rearwardly (i.e. to the left in FIG. 8), roller 92 will ride atop cam 94 activating switch 90, causing hydraulic cylinders 36 to retract and lower conveyor frame 14. Conversely, if switch plate 78 is moved forwardly (i.e. to the right in FIG. 8), roller 92' will ride atop cam 94 and activate switch 90', causing fluid to be injected into hydraulic cylinders 36 and forcing conveyor frame 14 to be raised. In either event, the lowering or raising of the conveyor frame will cause guide wheel frame 77 to pivot to restore cam 94 to the neutral position between rollers 92 and 92'.

Preferably, cam 94 is virtually the same length as the distance between rollers 92 and 92' so that the slightest movement of gauge wheel frame 77 and/or switch plate 78 will generate a movement of the conveyor frame upwardly or downwardly. This close tolerance between cam 94 and rollers 92 and 92' is necessary because very precise, variable adjustment of the digging depth of digger chain conveyor 12 into the ground is preferred. In some circumstances, an increase or decrease in digging depth of an inch or so is desirable. The fact that cam 94 extends almost completely across the distance between rollers 92 and 92' allows for such fine adjustment of the digging depth.

Gauge wheel frame 77 also includes a paddle wheel 106 which extends across the gauge wheel frame between side portions 80 and 80' immediately forward of the lower end of conveyor frame 14. Paddle wheel 106 is rotatable about its longitudinal axis by a conventional hydraulic motor (not shown) in a counterclockwise direction as viewed from FIG. 4 to scoop up onions which inadvertently roll the wrong way down digger chain conveyor 12 to the front of the machine. Paddle wheel 106 then flips the errant onions back onto the digger chain conveyor so that the digger chain conveyor can convey the errant onions up to the elevator conveyor 16. Preferably, paddle wheel 106 has flexible paddles made of a polymeric material to prevent damage to the onions it flips.

IV. Topping Plenum

Plenum 20 as shown in FIGS. 4, 6, 10 and 11 is basically an elongated chamber positioned above the downwardly inclined portion 108 of elevator conveyor 16. An opening 110 (FIGS. 6 and 10) is provided in the rear wall 112 of plenum 20 which connects with vacuum fan 22 for drawing a vacuum in plenum 20. The vacuum in plenum 20 draws air through opening 18 which extends along the bottom of plenum 20 and above the top of the two elevator 64. It is preferred that the erecting and lifting of the onions through the first and second air flow zones be generated by a vacuum. First, this insures continued control of air flow around and past the tops of the onions. This helps keep the tops erect an prevents them from fluttering excessively and uncontrollably. Second, it draws dirt and cut tops up and away from the onions, rather than allowing it to fall back into the onions.

In its most basic form of operation, plenum 20 draws the foliage 15a (FIG. 11) of the onion 15 upwardly and forces the onion to assume an erect position with the foliage oriented upwardly in a vertical position and the roots 15b oriented downwardly. To allow foliage 15a to be drawn upwardly into the plenum, cutter assembly 24 only extends partially across- opening 18 as shown in FIG. 11, leaving an unobstructed portion 18a (FIG. 11) of opening 18 in front of cutter assembly 24 so that as onions are conveyed underneath opening 18, the vacuum drawn through the unobstructed portion 18a will allow the foliage to be drawn upwardly into opening 18. As conveyor 16 conveys the onions toward and into cutter assembly 24, the cutter assembly will cut the erect foliage off the onion. After the onion foliage is cut, conveyor 16 drops the defoliated onion onto intermediate conveyor 26. The intermediate conveyor in turn convey the onions to the infeed end of rooting bed 28 where the roots and the remainder of the onion top are cut from the onion, leaving essentially only the onion bulb.

However, in some agricultural areas, the onions planted do not have a well developed root system so it is unnecessary to include a rooting bed 28 in the device. In northern states, for instance, certain types of root disease are not common so a well developed root system is unnecessary. In certain southern states such as Texas, varieties of onions have been developed with extremely long root systems which need to be cut off, thus the rooting bed 28 is included.

When no rooting bed 28 is included in the machine, the plenum 20 should be operated and include certain features to enable cutter assembly 24 to cut the foliage as close as possible to the bulb. First, the vacuum drawn by vacuum fan 22 must be increased such that the onions 15 are lifted off of elevator conveyor 16 (as shown in FIG. 11) against the bottom of cutter assembly 24 so that the erect foliage is severed extremely close to the bulb. To do this, an air control baffle 114 must be positioned below portion 108 of elevator conveyor 16 directly underneath the unobstructed portion 18a of opening 18 to prevent the onions from being drawn into plenum 20 through unobstructed portion 18a. Baffle 114 is supported by brackets 114a (FIGS. 4 and 11) mounted on an upper front cross bar 337 of chassis 32. Air control baffle 114 extends to a point almost directly below the leading edge of cutter assembly 24 as shown in FIG. 11, and basically prevents a strong current of air from being drawn vertically upwardly through the unobstructed portion 18a of opening 18. Instead, the bulbs resting on the top of portion 108 of elevator conveyor 16 are protected from strong air currents so they cannot be lifted off of elevator conveyor 16 when the onions are underneath unobstructed opening portion 18a. However, the foliage of the onion is not heavy enough to resist the upward suction of the air being drawn through unobstructed portion 18a so the foliage assumes the erect position described above when the foliage is underneath unobstructed portion 18a, before the onions reach cutter assembly 24. When the plenum is being operated in conunction with baffle 122, the onions literally are drawn or lifted upwardly off the conveyor 16 against the bottom of cutter assembly 24, where the onions are conveyed past air control baffle. 114.

Cutter assembly 24 as shown in FIGS. 11 and 13 includes a plurality of spaced fingers 118 which project underneath opening 18, but allow air to be drawn upwardly through the fingers with sufficient velocity to draw the lifted onions with erect foliage against the bottom of fingers 118 so that knives 120 drawn over the tops of fingers 118 will slice the onion foliage off quite close to the top of the onion bulb. Paddles 67 of elevator conveyor 16 prevent the onions from being held against the bottom of fingers 118 under the suction of the air by scraping or knocking the onions off of the fingers, paddles 67 being sufficiently long so as to knock the onions off of fingers 118. Besides, when the foliage is cut from an onion, the suction force on the onion itself is greatly reduced so that some of the onions will tend to fall from the fingers after the foliage is cut.

Another feature which controls when the onions will be lifted from the conveyor is the provision of an adjustable baffle 122 as part of the front wall 124 of the plenum 20. Adjustable baffle 122 extends across the front of plenum 20 and is pivotal on a hinge 125 so as to increase or decrease the size of opening 18 thereby decreasing or increasing the velocity of air being drawn through opening 18.

Baffle 122 is retained in one hingeable position or another by a plurality of arms 126 (FIGS. 11 and 17) which extend upwardly along baffle 122 and engage a series of spaced flanges 128 along the front wall 124 of plenum 20. At the lower ends of flanges 128, a series of arcuate slots 129 are provided. Fasteners or bolts 130 extend through the upper ends of arms 126 and into slots 129. As baffle 122 is pivoted, fasteners 130 will slide within slots 129 and can be tightened to hold baffle 122 in a selected angular orientation.

Figure 17:
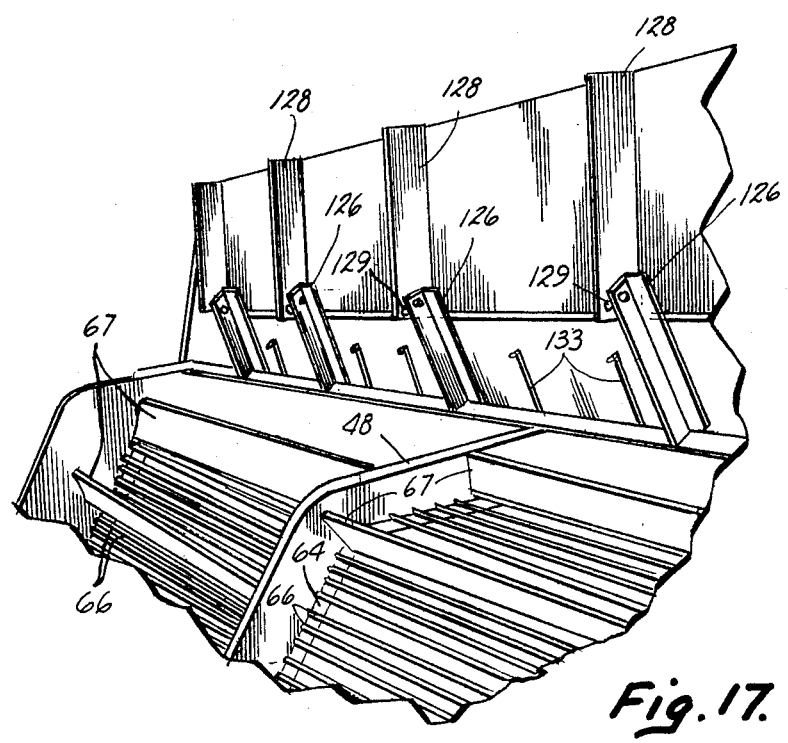
FIG. 17 is a detailed fragmentary perspective view of the plenum and elevator conveyor of the onion harvester.

Baffle 122 is also extendable since it includes two overlaying baffle members 131 and 132. Baffle member 131 is directly connected to hinge 125 and arms 126. Baffle member 132 is located on the rear side of baffle member 131 and is slidable upwardly and downwardly along baffle member 131. Baffle member 131 has a plurality of vertical slots 133 (FIG. 17). Fasteners extend through baffle member 132 and into slots 133 so that baffle member 132 can be positioned in selected positions on baffle member 131 by sliding fasteners 134 in slots 133 and tightening fasteners 134 when baffle member 132 reaches the desired position.

Baffle member 132 can be lowered toward elevator conveyor portion 108 a sufficient distance to restrict the flow of air drawn from in front of the machine underneath baffle 122 and into opening 18. This focuses the strength of the suction through fingers 118 and in combination with baffle 114 reduces the suction of air through unobstructed portion 18a of opening 18. Thus, the strength of the suction is directed where it is needed through fingers 118 to lift the onions, not through the unobstructed portion where only the foliage needs to be lifted and the onions oriented in a vertical position. Again, if a rooting bed is necessary, there is no need to operate the machine with a strong suction through opening 18 to lift the onions off of the conveyor because the rooting bed will cut not only the roots but most of the remaining portions of the onion tops not cut by cutter assembly 24.

V. Topping Cutter Assembly

Cutter assembly 24 is shown in detail in FIGS. 13–15A. It includes an elongated support 136 around which extends a continuous chain 138 which is driven by a drive gear 140 and motor 374 at one end of support 136 and a follower gear 142 at the other end of support 136. Chain 138 has a plurality of knives 120 connected to it so when drive gear 140 is driven by a hydraulic motor 374 around support 136, knives 120 will travel around support 136 as well. Along one of the elongated edges of support 136 are located fingers or tines 118 which are basically elongated tabs of metal which extend horizontally outwardly parallel to one another from the one elongated edge of support 136. Fingers 118 serve as register means against which onions register for topping. Thus, as chain 138 draws knives 120 over fingers 118, the onion foliage between the fingers will be severed. As shown in FIG. 13, fingers 118 are perpendicular to support 136 whereas knives 120 are at an acute angle with respect to support 136 as they pass over fingers 118, creating a scissors-like cutting effect as knives 120 pass over fingers 118.

To make the scissors-like cutting action more effective, knives 120 travel in a slot 146 located above fingers 118 in support 136. Slot 146 is formed between a flange 148 which extends outwardly from support 136 and a shoe molding 150 secured to the top of support 136 by fasteners 152. Shoe molding 150 curves over the edge of support 136 and terminates a short distance above flange 148 to form slot 146. Shoe 150 is preferably made of a polymeric material having a low friction coefficient to allow knives 120 to slide effortlessly along the lower edge of shoe molding 150. Chain 138 is drawn through a conduit 154 formed between shoe 150 and flange 148.

To hold knives 120 against the top of flange 148 so as to be close as possible to fingers 118, a wedge 156 is positioned and secured atop each knife 120 so as to travel within slot 146 as the knives move through slot 146. As shown in FIG. 14, the wedge 156 is secured atop each knife 120 such that the thickness of the wedge decreases in the direction of travel of the wedge and knife through slot 146. The thin portion of the wedge is introduced to the entrance of the slot, allowing the knife to enter the slot 146 easily. However, as the thick portion of the wedge 156 is moved into the slot, it wedges against the bottom of shoe molding 150 forcing knife 120 downwardly on flange 148.

Each knife 120 as shown in FIG. 15 has an offset portion 158 to allow the sharpened end of the knife 160 to rest against fingers 118 while allowing the shank of the knife connected to wedge 156 to rest on flange 148. Thus, when the wedge forces knife 120 against flange 148, it will also be urging the sharpened end of the knife against fingers 118 in a scissors-like fashion since fingers 118 are connected to flange 148 as shown in FIG. 15. As shown in FIG. 11, cutter assembly 24 is positioned under plenum 20 so that only fingers 118 and the knives 120 above the fingers extend underneath opening 18. The rest of the cutter assembly 24 is positioned in a recess 162 under the bottom wall 163 of plenum 20.

As shown in FIG. 13, follower gear 142 is mounted on support 136 by a clevis bracket 141 which is fastened to support 136 by an elongated threaded rod 143. Rod 143 is threaded within an end wall 145 of support 136. If the tension on chain 138 is to be increased or if slack is to be removed, threaded rod 143 is rotated so that clevis bracket 141 is urged away from support 136. Similarly, if chain 138 is to be removed or reduced in tension, rod 143 is rotated so that the clevis bracket is urged toward support 136. A locking nut 147 is threaded on rod 143 against wall 145 to lock rod 143 in the desired position.

VI. Vacuum Fan Assembly

Figure 25:
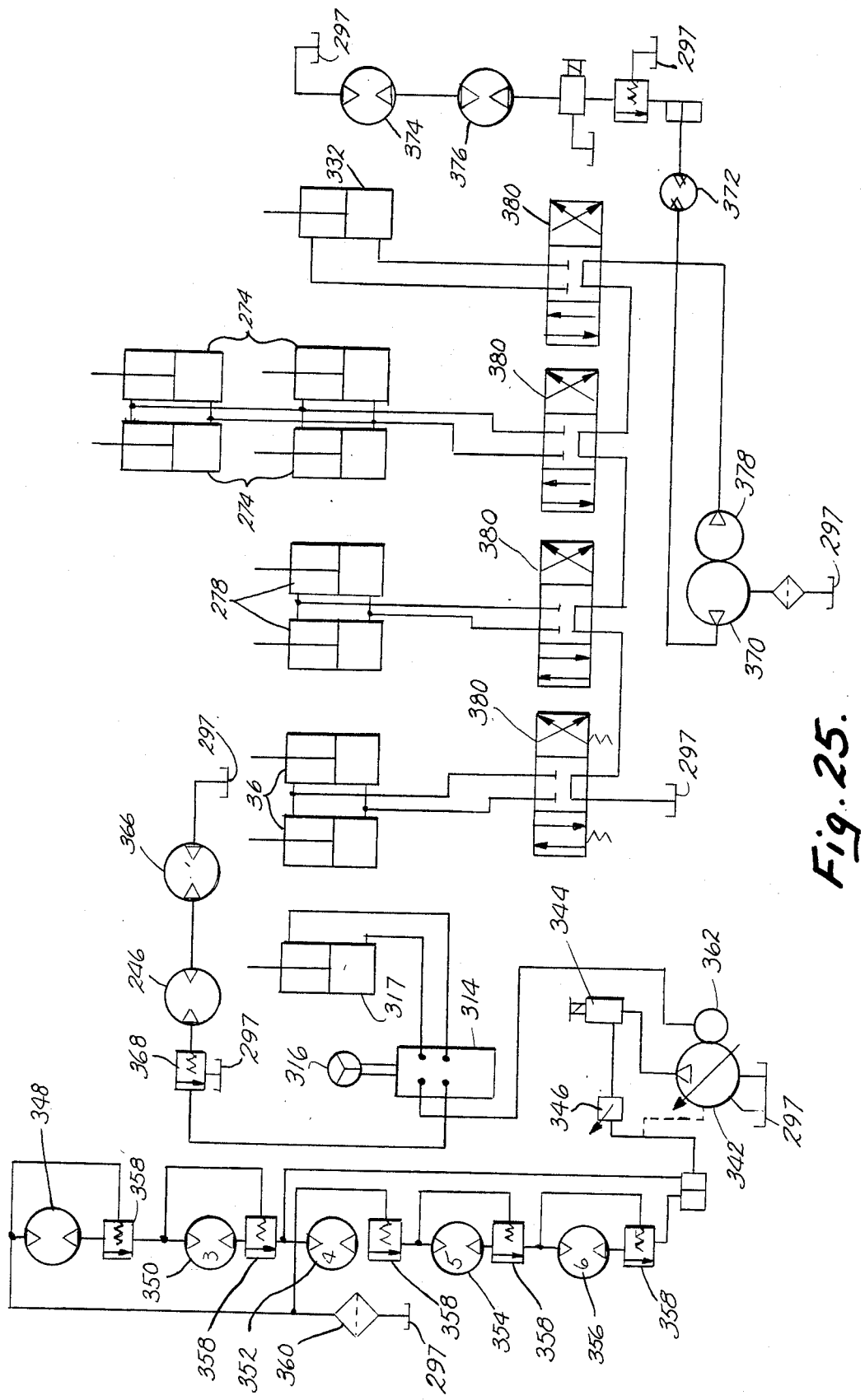
FIG. 25 is a schematic of the hydraulic system for controlling the conveyors and hydraulic cylinders utilized in the onion harvester of the present invention.

As indicated above, vacuum fan 22 draws air from plenum 20 creating the vacuum desired. Vacuum fan 22 includes a cylindrical housing 164 (FIGS. 16 and 16A) with an inlet opening 166 (FIG. 10) extending into the center of the cylinder and an outlet opening 168 (FIGS. 1, 4 and 16) at the end of the chute 170 positioned tangentially of the cylinder. Located inside housing 164 is an impeller 172 which can be in the form of a squirrel cage or any other type of rotary suction device which draws air through inlet opening 166 to generate the required vacuum and exhausts air out of outlet opening 168 at the end of chute 170. Impeller 172 is driven by a drive shaft 174 which is rotated by a hydraulic motor 348 (FIG. 25). Impeller 172 will, of course, draw the severed foliage as well as dirt and dust from the onions from plenum 20 and force the dirt and foliage out of outlet opening 168. However, some of the dirt cannot be exhausted by impeller 172 so an endless conveyor belt 176 extends around the inside of housing 164 to collect the dirt and travels along the bottom of chute 170 to carry the accumulated dirt out of the housing.

Figure 16:
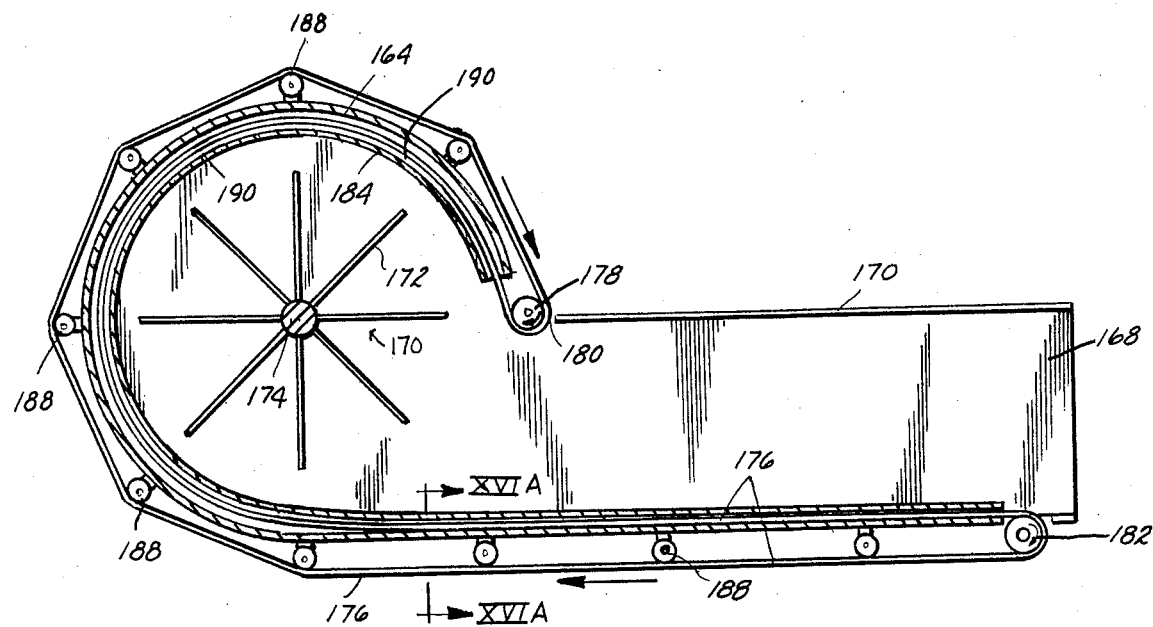
FIG. 16 is a cross section taken along the plane of line XVI—XVI of FIG. 4.
Figure 16A:
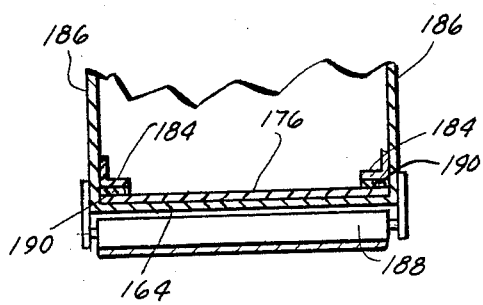
FIG. 16a is a cross section taken along the plane of line XVIa—XVIa of FIG. 16.

As shown in FIG. 16, conveyor belt 176 is a continuous belt and is driven by a first belt drive shaft 178 adjacent the slot 180 through which conveyor belt 176 enters housing 164, and a second belt drive shaft 182 located along the bottom wall of chute 170 at the end of the chute. Conveyor belt 176 enters through slot 180 and travels along the inside cylindrical walls of housing 164, then travels along the bottom of chute 182 where it exits opening 168 and travels back around the outside of the housing to slot 180. As shown in FIG. 16A, conveyor belt 176 is held against the inside walls of housing 164 by metal flanges 184 which extend inwardly from the flat sidewalls 186 of housing 164. Flanges 184 extend along the cylindrical walls of housing 164 and along the bottom of chute 170 on either side of conveyor belt 176 to hold the conveyor belt against the inside of the cylindrical walls and the bottom of chute 170 so that the conveyor belt does not interfere with the operation of impeller 172. To reduce the friction inside the housing, a shim 190 (FIGS. 16 and 16A) is fastened to and extends the length of each flange 184. Each shim 190 is located between each flange 184 and conveyor belt 176. Shim 190 is made of a polymeric material with a low coefficient of friction to allow conveyor belt 176 to slide freely along flanges 184.

On the outside of the machine, conveyor belt 176 is supported by rollers 188 which are spacedly positioned along the outside of the cylindrical walls of housing 164 and the bottom of chute 176. Each roller 188 is stationary except that it is allowed to rotate about its longitudinal axis to allow the return portion of the conveyor belt to travel smoothly along the outside of the housing before entering the housing through slot 180.

VII. Rooting Bed

Figure 18:
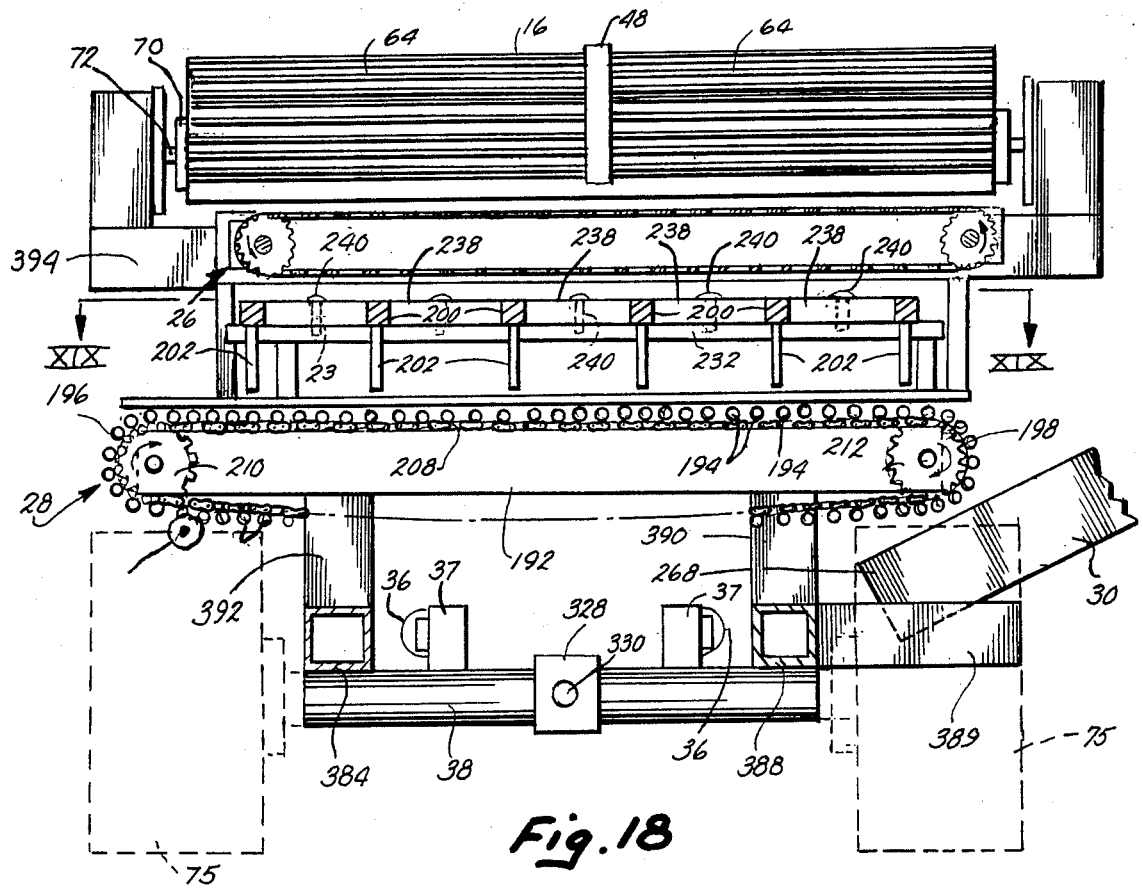
FIG. 18 is a cross section taken along the plane of line XVIII—XVIII of FIG. 4.

Intermediate conveyor 26 and rooting bed 28 travel in opposite directions, and intermediate conveyor 26 is shorter than rooting bed 28 (FIG. 18). As shown in FIGS. 4, 10 and 18, intermediate conveyor 26 is positioned underneath the end of elevator conveyor belt 16 and serves to convey all the onions falling off elevator 16 to the left or infeed end of rooting bed 28 (as viewed in FIG. 18). Thus, the onions will have to travel the full length of rooting bed 28 from left to right, as illustrated in FIG. 18. Intermediate conveyor 26 can be any standard conveyor, utilizing a belt or the like. However, preferably, the intermediate conveyor is made of the same conveyor structure as the digger chains 52 with side drive bands 54 and parallel bars 55 extending between the two side bands 54, as shown in FIG. 12.

Rooting bed 28 includes a conveyor 192 with a plurality of parallel bars 194 which are movable from the infeed end 196 of conveyor 192 to the outfeed end 198 and are rotatable about their longitudinal axes. A series of racks 200 are positioned transversely above conveyor 192. Each rack 200 includes downwardly depending fingers 202, the free ends of which almost contact the top of conveyor 192.

Racks 200 are reciprocable from side to side by means to be described below. As bars 194 travel from the infeed end 196 to the outfeed end 198, the rotation of bars 194 causes the defoliated onions 203 which drop onto conveyor 192 to rotate about the onions' longitudinal axes with their longitudinal axes parallel to bars 194 because the roots 204 and stems 205 of the onions 203 (FIG. 19) will prevent the onions from rolling stem over root on rotating bars 194. As racks 200 are moved from side to side, fingers 202 will hit the onions and cause the onions to roll stem over root on bars 194 so that the roots and/or stems will momentarily project between adjacent bars 194. A series of rotating blades 206 (FIGS. 19 and 21) positioned beneath bars 194 will slice the roots and stems from the onions. Fingers 202 must be sufficiently flexible that they do not damage the onions as they contact them. Preferably, they are made of a pliable rubber hose material or equivalent. Material such as ⅜ inch wall heater hose has been found operable.

Bars 194 are moved from the infeed end 196 to the outfeed end 198 of conveyor 192 by two endless drive chains 208, each of which is located on one side of conveyor 192 (FIG. 21) and driven by drive gears 210 at the infeed end and carried by driven gears 212 at the outfeed end. As shown in FIG. 21, each bar 194 is connected at its ends to a drive chain 208 by a bearing block 214 in which the end of the rod is rotatably mounted. Bearing block 214 has an opening therethrough which permits bar 194 to rotate within the bearing block, and the bearing block is fixedly secured to chain 208 so as to force the bar to travel as the chains are driven in tandem by drive gears 210. A hold-down wheel 210a is located on the opposite side and just ahead of gear 210 to keep pieces of dirt or rocks from wedging between chain 208 and gear 210 and forcing chain 208 off of gear 210. Drive chains 208 are endless, and bars 194 are attached around the entire length of the chains 208 to form an endless conveyor system where the bars continuously travel across the top of conveyor 192 and return across the bottom. As shown in FIG. 21, drive gears 210 are driven on a drive shaft 211 which is driven by a hydraulic motor.

As shown in FIGS. 20, 20A and 21, each bar 194 is rotated by a rotation gear 216 secured to one end of the bar. Gears 216 engage a rotation chain 218 which is driven by a drive gear 220 driven by a hydraulic motor 366 at one end of conveyor 192 and supported by a driven gear 222 at the other. Between gears 222 and 220, rotation chain 218 and drive chain 208 slide across a flange 224 which projects inwardly from the right side cover 226 of conveyo 192. Rotation chain 218 can be kept stationary or can be driven at a variety of different speeds, depending upon which speed has been found to be effective to cause the onions to roll about their longitudinal axes and force the longitudinal axes of the onions to be oriented transversely of conveyor 192. It is important, however, that rotation chain 218 not be driven at the same rate of speed as chain 208 across the top of flange 224, otherwise gears 216 will not rotate. It is also important that gears 220 and 222 be spaced more closely together than gears 210 and 212. This allows gears 216 to disengage from chain 218 at outfeed end 198 so that the gears and bars can be returned to the infeed end 196 where gears 216 will be brought into contact with chain 218 at the infeed end of flange 224.

Figure 19:
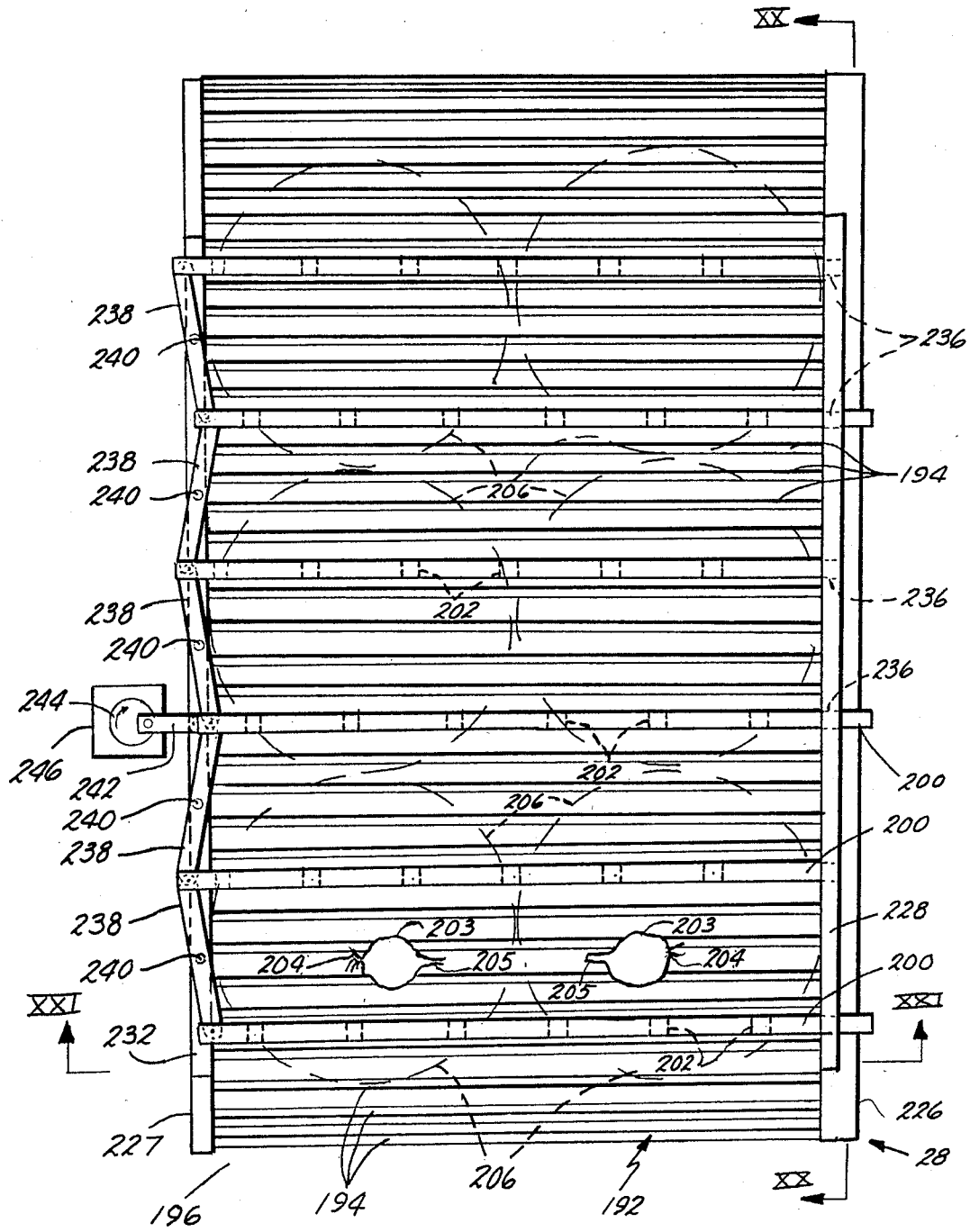
FIG. 19 is a top plan view of the rooting bed of the present invention taken along the plane of line XIX—XIX of FIG. 18.

One end of each rack 200 is supported by a rail 228 along one side of conveyor 192, rail 228 being elevated above conveyor 192 on legs 230 (FIGS. 19, 20 and 21). The other end of each rack 200 is supported by a rail 232 which extends above and along the other side of conveyor 192 and is supported above conveyor 192 by legs 234 (FIG. 21) which extend upwardly from side cover 227.

One end of each rack 200 is slidably received within an opening 236 (FIG. 20) which extends through rail 228 to allow rack 200 to reciprocate from side to side across and above conveyor 192. The other end of each rack 200 is pivotally connected to one end of a pivotable link 238 (FIGS. 18 and 19). Each pivotably link 238 is pivotably mounted at its center by a pivot pin 240 (FIG. 19) to the top of rail 232. In addition, the pivotable links 238 are pivotally connected in an end-to-end fashion to each other, as shown in FIG. 19. Thus, if one of the pivotably links is forced to pivot about its pivot pin 240, the remaining links 238 will also pivot about their pivot pins 240, since all of the pivotal links are interconnected. Furthermore, as one end of each pivotal link is moved toward the center of conveyor 194, the other end will move away from the center. Thus, the two racks 200 attached to the opposite ends of the same link 238 will be forced to move in opposite directions across conveyor 194.

The pivotable links 238 are pivoted by a drive link 242 (FIG. 19) which is pivotably connected to an end of one of the racks 200. At the other end, drive link 242 is pivotably connected in an offset manner to a rotor 244 of a hydraulic motor 246. As rotor 244 rotates, drive link 242 will be pulled toward and away from conveyor 192, pushing and pulling the rack 200 to which it is pivotably connected. Since the rack 200 directly connected to drive link 242 pivotally connected to the ends of two pivotable links 238, the two pivotably links 238 will be forced to pivot about their pivot pins 240, forcing the other pivotal links 238 to pivot and forcing all racks 200 to reciprocate from side to side across and above conveyor 192.

As racks 200 reciprocate, fingers 202 which depend downwardly from racks 200 will bat the detopped onions 203 (FIG. 19), which by this time have their longitudinal axes oriented transversely across conveyor 192 parallel to bars 194, as shown in FIG. 19. When the onions are batted by fingers 202, the onions will roll root over stem, causing the roots and stems momentarily to extend downwardly between two adjacent bars 194. When this happens, one of the rotating blades 206 which rotate underneath the bars 194 traveling across the top of conveyor 192 will cut the root or stem projecting between the bars. As the onions 203 travel along the length of conveyor 192, they each will be batted many times by fingers 202 so that there will be many chances for the roots 204 and stems 205 to be knocked into the whirling blades 206. Fan blades 206 are driven and mounted on drive shafts 207 (FIG. 21). Drive shafts 207 are driven by a single hydraulic motor (not shown). Fan blades 206 are essentially sharpened elongated strips of hardened steel similar to blades found in lawnmowers. It is important to position blades 206 as close to the bottom of bars 194 as possible to cut as much of the onion stems or roots as possible that extend below bars 194.

VIII. Alternative Rooting Bed

Figure 23:
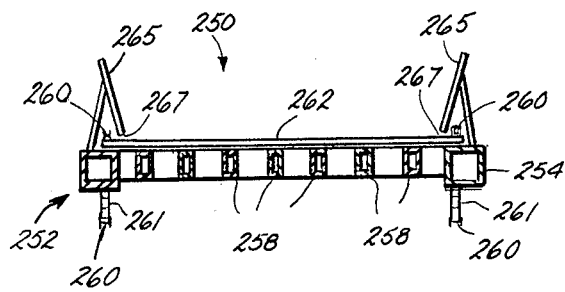
FIG. 23 is a cross section taken along the plane of line XXIII—XXIII of FIG. 22.
Figure 22:
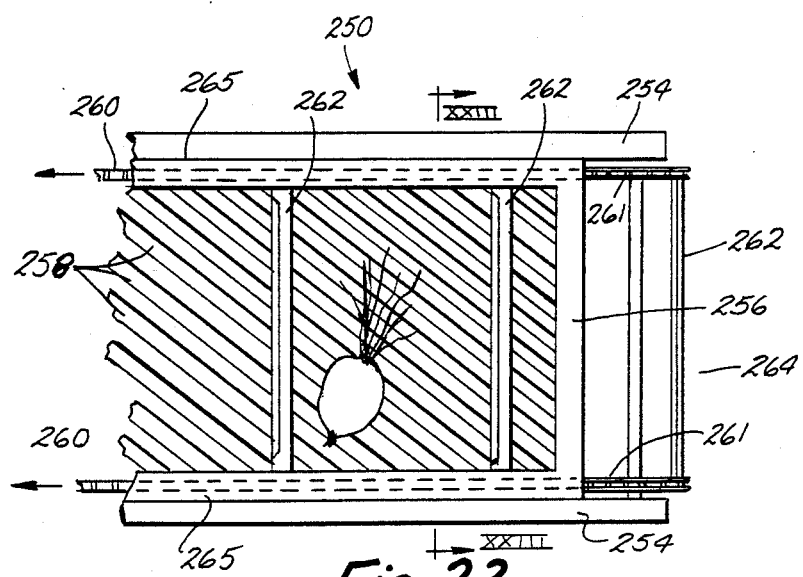
FIG. 22 is a top elevation of a modified embodiment of the rooting bed of the present invention.

The alternative bed 250 includes a stationary frame 252 with elongated side members 254 and end frame members 256 joining the two spaced side frame members 254 (FIGS. 22 and 23). Extending across frame 252 at acute angles to side frame members 254 are a plurality of stationary bars 258 which are spacedly positioned parallel to one another.

Drive chains 260, which extend parallel and along side frame members 254, have a plurality of sharpened blades 262 extending between them perpendicular to side frame members 252. Chains 260 are driven by drive gears 261 at the infeed end 264 of rooting bed conveyor 250. Driven gears (not shown) support chains 260 at the outfeed end of conveyor 250.

Drive chains 260 carry blades 262 in a continuous fashion across the top of conveyor 250 and return across the bottom. The identical rack and finger assembly 200 and 202 employed with the conveyor 192 described above is also employed with conveyor 250. The fingers bat onions which are dropped onto the infeed end 264 of conveyor 250, causing the onions to rock from side to side so that eventually either the stem and root of each onion will be caught between two adjacent bars 258 the moment a blade 262 passes beneath the onion, severing the root or stem between the bars.

The blades 262 gradually move onions from the infeed end 264 to the outfeed end of rooting bed 250 as blades 262 pass underneath the onions on bars 256. The angular orientation of bars 256 with respect to the direction of travel of blades 262 also facilitates the movement of onions by blades 262. If bars 256 were parallel to blades 262, there would be a greater tendency for bars 256 to resist the transport of onions across the bed.

To prevent onions from falling from the bed, sidewalls 265 (FIG. 23) are positioned along the sides of the bed above side frame members 254. The bottoms of sidewalls 265 do not touch side frame members 254 leaving gaps 267 to allow blades 262 to pass underneath the lower edges of the sidewalls.

Again, the provision of either the two rooting beds is optional, depending upon the type of onion to be harvested. If the onion to be harvested does not have an extensive root system, the rooting bed can be omitted entirely and plenum 20 can be operated at a high vacuum to lift the onions from elevator conveyor 16 so that the onions will be lifted against fingers 118 of the cutter assembly 24 where the foliage can be cut flush against the onion. In the event that no rooting bed is needed, a conveyor should be positioned so as to catch the onions dropping from the upper end of elevator conveyor 16 and carry the onions approximately where the outfeed end 198 of rooting bed conveyor 192 is located as shown in FIG. 19.

IX. Bulk Loader

After the onions are conveyed to the outfeed end of the rooting bed, they will drop onto the infeed end 268 (FIG. 18) of bulk loader conveyor 30 which extends underneath the outfeed end 198 of rooting bed conveyor 192. From there, bulk loader conveyor 30 transports the trimmed onions to a truck or other vehicle traveling alongside harvester 10.

Figure 3:
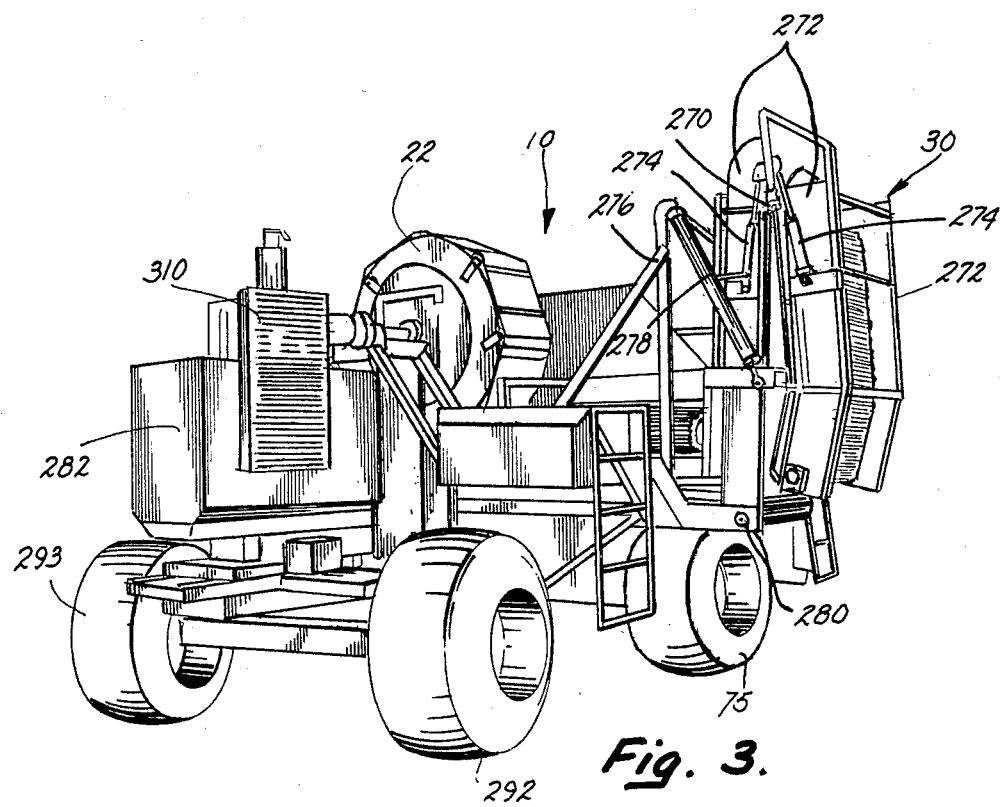
FIG. 3 is a right rear perspective view of the onion harvester.

Bulk loader conveyor 30 is articulated at its middle so as to fold in half and retract to the position illustrated in FIG. 3 by means of an articulated joint 270 on each of the side frame members 272 (FIGS. 2 and 3) which support bulk loader conveyor 30. Each of the two articulated side frame members 272 includes a pair of hydraulic cylinders 274 for articulating the bulk loader conveyor about joints 270. Each cylinder 274 is secured at one end to a side frame member 272 on one side of joint 270. The other end, namely, the piston end, is pivotally connected to the piston end of the other hydraulic cylinder 274. As hydraulic cylinders 274 contract in length, the bulk loader conveyor unfolds. As hydraulic cylinders 274 expand in length when fluid is injected into the cylinders, they force bulk loader conveyor 30 to fold at articulated joints.

A bulk loader support frame 276 extends upwardly from harvester 10 and connects with side frame members 272 by means of two hydraulic cylinders 278, one hydraulic cylinder 278 connecting each side frame member 272 to support frame 276 (only one hydraulic cylinder 278 is shown in FIG. 3). When hydraulic cylinders 278 are retracted, they raise bulk loader 30 to the position shown in FIG. 3, side frame members 272 being pivotally mounted to the chassis of harvester 10 at pivot points 280. When hydraulic cylinders 278 are filled with the fluid, they lower bulk loader 30. Preferably, therefore, hydraulic cylinders 274 are actuated to unfold bulk loader conveyor 30 as hydraulic cylinders 278 are extended so that bulk loader 30 can be unfolded without hitting the ground.

X. Motor and Hydraulic System

Figure 26:
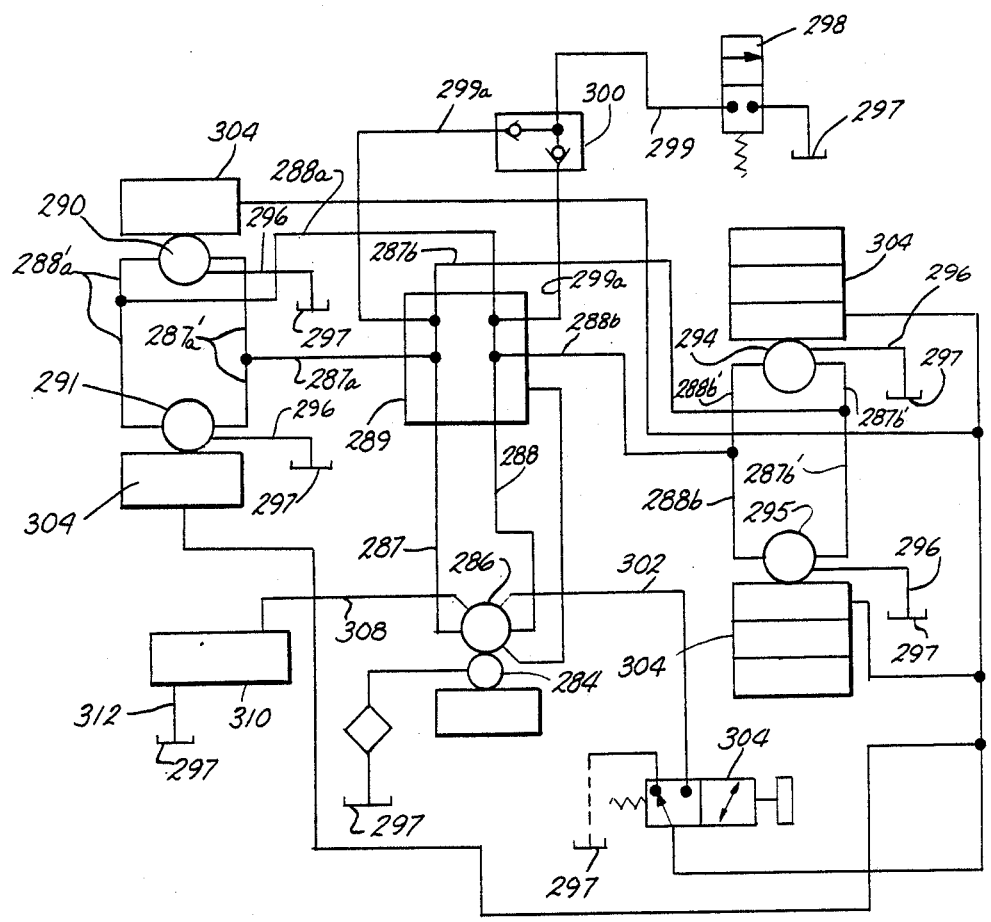
FIG. 26 is a hydraulic schematic illustrating the control system for the drive motors which drive the onion harvester of the present invention.

The motor and drive assembly is illustrated in FIGS. 3, 24 and 26. A diesel motor 282 operates a charge pump 284 and a variable pump 286. The charge pump is operated by a pedal on bridge 104. When the operator shuts the charge pump off by the pedal, the variable pump 286 goes to the neutral position where it does not pump fluid.

When it pumps fluid, variable pump 286 sends pressurized fluid through lines 287 and 288 to a distribution block 289. Distribution block 289 distributes the pressurized fluid from line 287 to a first line 287a extending toward the rear wheels and a second line 287b to supply pressurized fluid for the front wheels. Block 289 also splits the pressurized fluid from line 288 into a first line 288a, which supplies pressurized fluid to the rear wheels, and a second line 288b, which supplies pressurized fluid to the front wheels. The fluid from lines 287a and 288a is delivered to hydraulic motors 290 and 291 (FIGS. 24 and 26), each of which drives a rear wheel 292 and 293, respectively. Fluid from line 287a is split into lines 287a' each of which connects to a pump 290 and 291 and the fluid from line 288a is connected to lines 288a', each of which supplies pressurized fluid to a motor 290 or 291.

Line 287b is split into lines 287b' which each delivers fluid to a hydraulic motor 294 or 295. Line 288b is split into lines 288b' also to deliver fluid to motors 294 and 295. Each motor 294 and 295 drives a front wheel 75. Motors 290 and 291 therefore, drive rear wheels 292 and 293 while motors 294 and 295 drive front wheels 75. Exhaust lines 296 exhaust fluid from each motor 290, 291, 294 and 295 and deliver the spent fluid to a reservoir 297 where it can be drawn upon for use by variable pump 286 and/or charge pump 284.

A relief valve 298 is connected to block 289 by a line 299 which bifurcates into lines 299a which connect to lines 287 and 288, respectively. In the event that pressure lines 287 or 288 exceed a certain maximum pressure, fluid will be vented through lines 299a and 299 for release by relief valve 298 into reservoir 297. A shuttle valve 300 prevents the flow of fluid from one of the lines 299a into the other, allowing only the flow of fluid from one or both of the lines 299a into line 299 for release by relief valve 298.

A line 302 connects a high pressure discharge port of a variable pump 286 to a brake pedal 304 which is mounted on the bridge 104 for operation by the driver. When pedal 304 is depressed, it delivers pressurized fluid to a brake 306 on each of the front wheels 75 and rear wheels 292 and 293. Brakes 306 prevent the wheels from turning. When pedal 304 is released, the pressurized fluid previously delivered to brakes 306 is shunted to reservoir 297, and the brake pedal shuts off the flow of pressurized fluid through the line 302.

The variable pump 286 draws fluid through a line 308 from an oil cooler 310 mounted on the back of harvester 10 as shown in FIG. 3. Oil cooler 310, in turn, receives oil from a line 312 which is in fluid communication with reservoir 297.

The harvester is steered by the rear wheels. A power steering unit 314 has a steering wheel 316 (FIGS. 1 and 25) mounted on bridge 104. The power steering unit 314 delivers hydraulic fluid to a power steering cylinder 317 (FIGS. 24 and 25). One end of the cylinder 317 is pivotally connected to a rear axle 318 of the harvester. The other end of cylinder 317 is connected to a steering linkage 320 which extends parallel to rear axle 318. The ends of linkage 320 pivotally connect with arms 322 which project rearwardly from the housings of hydraulic motors 290 and 291 which drive the rear wheels. Motors 290 and 291 in turn are pivotably connected by pivot pins 324 to the ends of rear axle 318. Thus, when hydraulic cylinder 317 is extended, the steering linkage 320 will be urged toward the right when viewed from FIG. 24, which causes the machine to turn left since wheels 292 an 293 will be forced to pivot clockwise about pivot pins 324. Conversely, when hydraulic cylinder 317 is retracted, the steering linkage 320 will be urged toward the left when viewed from the perspective of FIG. 24 which causes the machine to turn to the right since wheels 292 and 293 will be forced to pivot counterclockwise about pivot pins 324.

Front wheel drive motors 294 and 295 and front wheels 75 are mounted at the ends of a front axle 326 (FIGS. 4, 5, and 24). Front axle 326 is pivotally connected intermediate its ends to lower front crossbar 38 by a clevis bracket 328 (FIGS. 5, 18, 24 and 24A) which extends over the lower front crossbar 38 and front axle 326. A bolt or clevis pin 330 extends through and between the arms of the clevis bracket, and through axle 326 and crossbar 38 to allow the front axle to pivot in a vertical plane about its midpoint. This allows the front axle to pivot to accommodate irregularities in ground contour.

The pivoting of the front axle also permits the machine to travel on the side of a hill. To hold the machine in a vertical, upright position while front axle 326 pivots to conform to the grade of the hill, a hydraulic cylinder 332 (FIGS. 4, 5, 24 and 25) is connected pivotably at one end to one end of front axle 326. The other end of hydraulic cylinder 332 is connected to a bracket 334 which is mounted on an intermediate front crossbar 336 which extends above lower front crossbar 38 (FIGS. 4, 5 and 10). Thus, hydraulic cylinder 332 can hold front axle 326 in virtually any desired angular orientation relative to the rest of the chassis and the machine.

Rear axle 318 is likewise pivotally mounted to a rear cross frame member 338 by a clevis bracket 340 identical to clevis bracket 328 which allows the rear axle to pivot when the front axle pivots or is forced to pivot by cylinder 332. Thus, the wheels and axles will follow the contour of the ground while the rest of the machine can remain at any desired angle relative to the ground.

The rest of the hydraulic control system is illustrated in FIG. 25. A first hydraulic pump 342 supplies pressurized hydraulic fluid through a solenoid valve 344 and a flow control valve 346 to a first hydraulic motor 348 for operating first and second drive belt shafts 178 and 182 of conveyor belt 176, and for operating impeller 172 in vacuum fan 22. Pump 342 also supplies fluid to a motor 350 for operating intermediate conveyor 26 and rooting bed conveyor 192. A motor 352 is also supplied with pressurized fluid from pump 342 and operates bulk loader conveyor 30. A motor 354 receives fluid from pump 342 and operates elevator conveyor 16. A motor 356 is also connected to pump 342 and operates digger chain conveyor 12. Each of the motors 348–356 has a relief valve 358 in the lines supplying fluid to it to divert fluid around the motor if the motor meets too much resistance for it to operate or if one does not want to operate that motor, valves 358 being manually operable. The relief valve will shunt fluid around the motor with which it is associated. Ultimately, the fluid circulated through or around motors 348–356 will be circulated through a filter 360 before being returned to reservoir 297.

A pump 362 supplies hydraulic fluid to power steering unit 314 which in turn directs fluid to power steering cylinder 317. Pump 362 also supplies fluid through power steering unit 314 to motor 246 (FIG. 19) for racks 200, and a motor 366 (FIG. 21) which operates drive gear 220 of rotation chain 218 which rotates bars 194 in rooting bed 28. A relief valve 368 is positioned in the line supplying fluid to motors 246 and 366 for directing fluid to reservoir 297 in the event that either motor 246 or 366 encounters resistance or becomes blocked, or if one wants to shut down motor 246 or 366, valve 368 being manually operable. Fluid circulated through motors 246 and 366 is exhausted to reservoir 297 for recirculation to pumps 342, 284 or 286.

A pump 370 supplies fluid to a motor 372 for an oil cooler fan for cooling oil cooler 310. Pump 370 also supplies fluid to a motor 374 (FIG. 14) which operates cutter assembly 24. Finally, pump 370 supplies fluid to a motor 376 for cutters 248 in rooting bed conveyor 28.

A pump 378 supplies fluid to hydraulic cylinders 36, 274, 278 and 332. Hydraulic cylinders 36, of course, are for raising and lowering the digger bed conveyor. Hydraulic cylinders 278 raise and lower bulk loader conveyor 30. Hydraulic cylinders 274 articulate bulk loader conveyor 30, and hydraulic cylinder 332 is the leveling cylinder on the front axle for adjusting the tilt of the harvester about the front and rear axles. Each hydraulic cylinder 36, 274, 278 and 332 is controlled by a four-way solenoid valve 380, each solenoid valve 380 is selectively adjustable to three positions. A first position is where fluid is bypassed from the hydraulic cylinders through the valve where the hydraulic cylinders will neither extend nor retract. The second position is where fluid is injected behind the pistons in the hydraulic cylinders to extend the cylinders. A third position is where hydraulic fluid is injected in front of the pistons, causing the pistons to retract within the cylinders. When the hydraulic cylinders extend, the solenoid valves exhaust fluid from in front of the pistons. When the hydraulic cylinders retract, the solenoid valves exhaust fluid from behind the pistons. Solenoid valves 380 are conventional and currently available on the market.

XI. Chassis And Bridge Assembly

As shown in FIGS. 1, 2, 4 and 10, harvester 10 is controlled from bridge 104 which extends across the front of the machine above elevator conveyor 16. Bridge 104 is basically a catwalk with guardrails to allow one worker to walk across the front of the machine above elevator conveyor 104 and pick rocks or other debris from the elevator conveyor, while a second operator sits in a seat 382 and operates and steers the machine with steering wheel 316. A control panel 386 (FIG. 1) is positioned within the reach of the second operator at the wheel. Controls for operating solenoid valves 380, pumps 342, 362, 370 and 378, a lever for operating valve and cable 102 for switchplate 78, a brake pedal and a key switch for starting the diesel engine 282 for operating the hydraulic pumps are mounted on control panel 386. Thus, the entire machine can be operated by an operator sitting in seat 382, leaving another operator to check for rocks and the like on the elevator conveyor.

Chassis 32 has been substantially described previously, but several features remain. First, as shown in FIGS. 18 and 24, side chassis members 384 and 388 connect lower front crossbar 38 and rear cross frame member 338 to form a rectangular frame on which the diesel engine 282 and the rest of the harvester are supported. A small rectangular frame 389 (FIGS. 18 and 24) mounted on side chassis member 388 supports the infeed end of the bulk loader conveyor 30.

Two lower vertical members 390 and 392 (FIGS. 5 and 24) extend upwardly from the ends of lower front crossbar 38 to support intermediate front crossbar 394 to which arms 396 which carry bridge 104 are attached. Arms 396 also support upper front crossbar 337 which supports baffle 114.

OPERATION AND SUMMARY

The operation of harvester 10 has been explained at various points above with reference to its various features, but the overall operation will be explained below. After the vegetable harvester has been transported to the field to be harvested, it is positioned at the ends of four rows of vegetables such that the four rows are presented to the front of the digger chain conveyor 12, the four rows being previously planted to be no wider than the width of digger chain conveyor 12. Switch plate 78 is adjusted to the desired digging depth by Bowden cable 102. Then the diesel motor is turned on and the machine is moved forwardly as digger chain conveyor 12 is lowered by hydraulic cylinders 36 to penetrate the earth. Gauge roll frame 77 and gauge wheel 76 will stop the penetration of digger chain conveyor 12 into the earth when the appropriate digging depth is reached.

As the machine is moved forwardly by motors 290, 291, 294 and 295, the digger chain unearths vegetables and delivers vegetables to the bottom of elevator conveyor 16. Elevator conveyor 16 in turn transports the vegetables across the two air flow zones created underneath plenum 20, the first air flow zone being created up through unobstructed portion 18a of opening 18 above air control baffle 114, and the second air flow zone being created between and below fingers 118 of cutter assembly 24. Since the first air flow zone is of a lower velocity than the second, the first air flow zone will cause the vegetable foliage to stand erect in a vertical position above that portion of elevator conveyor 16 immediately above baffle 114.

When the vegetable foliage is erect, it extends upwardly through unobstructed portion 18a where it can be presented directly to and between fingers 118 of cutter assembly 24. As elevator conveyor 16 moves the vertically oriented vegetables beyond baffle 114, the vegetables enter the second, high velocity air flow zone underneath and between fingers 118 which literally lifts the vegetables off of conveyor 16 against the bottoms of fingers 118 where the scissoring action of knives 120 will sever the foliage from the vegetables.

Of course, the operation of two air flow zones described above is only practiced to cut vegetables which have no well developed root systems. If a well developed root system is present, the second air flow zone is not maintained at a high velocity to lift the vegetables from the conveyor. Instead, the velocity of the first air flow zone is maintained so as to make the foliage stand erect, and the foliage is cut without lifting the vegetables from the elevator conveyor so as to leave a stem on the top of the vegetables.

When harvesting vegetables with well developed roots, a rooting bed 28 is provided. Intermediate conveyor 26 conveys the vegetables from elevator conveyor 26 to the infeed end of rooting bed 28. Rotating parallel bars 194 transport the vegetables from the infeed end to the outfeed end of rooting bed 28. While the vegetables are being transported on rooting bed 28, bars 194 rotate so as to align the longitudinal axes of the vegetables parallel to the bars. When the vegetables are so aligned, racks 200 bat the vegetables gently so that the vegetables momentarily rotate stem over root so that the stem or root will project momentarily downwardly between bars 194 where a series of rotating blades 206 slice the roots and stems from the vegetables.

Alternatively, an alternative bed 250 can be used instead of conveyor 192 with the blades 262 gradually moving vegetables from the infeed end to the outfeed end of rooting bed 250. The racks above the alternate bed will bat the vegetables such that the vegetables will momentarily project between bars 258 such that either the root or stem will be severed as the blades severe the member of the vegetables which projects between two adjacent bars.

Regardless of whether no rooting bed is used or whether either of the two alternative rooting beds are used, the vegetables are conveyed from elevator conveyor by some means to the infeed end of bulk loader conveyor 30 which has been unfolded and extends away from harvester 10 to deliver trimmed vegetables to a truck which travels directly alongside the harvester as the harvester travels across the field harvesting and trimming vegetables simultaneously.

While several embodiments of the machine have been disclosed and described, other embodiments and variations will be apparent to those of ordinary skill in the art. These are encompassed by the spirit and broader aspects of the invention as defined in the appended claims.

The embodiments of the invention in which an exclusive property or privilege is claimed are defined as follows:

1. An apparatus for harvesting vegetables having appendages such as top foliage which can be blown erect by a flow of air, as for example onions, and which appendages must be removed, said apparatus comprising:
   means for extracting the vegetables from the ground and conveying them over an opening through which air continuously flows in first and second adjacent air flow zones;
   means for generating sufficient continuous air flow in said first air flow zone to cause the appendages of the vegetables to be blown upwardly into a generally erect condition;
   said first air flow zone being free of impediments for a distance sufficient to allow the appendages of the vegetables to stand erect;
   register means located in said second air flow zone, said register means including bottom surfaces and openings opening toward the direction from which said conveyor means is traveling, and being at a level adapted to receive the erect appendages of the vegetable, whereby the erect appendages of vegetables on said conveyor means are received in said openings in said register means;
   means for generating an increased continuous flow of air in said second air flow zone which is sufficient to lift the vegetables upwardly from said conveyor means and into contact with said bottom surfaces of said register means;
   cutting means generally adjacent said register means for cutting said erect appendages of the vegetables when they are in contact with said register means whereby the appendages will be removed and the vegetables will fall back onto said conveyor means for conveyance away from said first and second air flow zones.

2. The apparatus of claim 1 including vacuum means to generate said flow of air in said first and second air flow zones, whereby improved control of the vegetable appendages is maintained and dirt and foliage are drawn away from the vegetables.

3. The apparatus of claim 2 in which said vacuum means comprises a single source of vacuum for generating a flow of air both in said first air flow zone and in said second air flow zone;
   said apparatus including a deflector baffle positioned below said conveyor means at said first air flow zone to reduce the flow of air generated by said vacuum means and thereby prevent vegetables from being drawn upwardly off of said conveyor means and through said first air flow zone.

4. The apparatus of claim 3 in which said vacuum means includes a plenum having an opening above said conveyor means and encompassing said first and second air flow zones;
   said plenum including means for adjusting the size of said opening.

5. The apparatus of claim 4 in which said adjusting means are provided for adjusting the distance between the edge of said vacuum opening, along said first air flow zone, and said conveyor.

6. The apparatus as recited in claim 5 where in said adjusting means includes a plenum baffle pivotably mounted on said plenum forming a portion of said plenum around said first opening portion, pivotably mounted so as to constrict or widen said first opening portion, and said baffle being extendable to adjust the distance between it and said conveyor.

7. The apparatus of claim 1 in which said cutting means comprises a plurality of knives mounted on means for conveying said knives, said means for conveying said knives being positioned adjacent said register means and being operably connected to knife drive means for driving said knife conveyor means and thereby moving said knives across said register means in one direction.

8. The apparatus of claim 7 in which said cutting means includes a track having a slot in which said knives travel, said slot being positioned immediately adjacent said register means, and a wedge-shaped shoe on the top of each knife and receivable in said slot as each knife passes through said slot, to thereby wedge each knife against said register means as it passes thereover.

9. The apparatus of claim 8 in which said cutting includes an elongated support extending transversely across and above said conveyor means, said support including said slot and track means, said knife conveyor means comprising an endless drive chain extending around said support, said knives being attached to said endless drive chain, whereby movement of said chain around said support moves said knives through said slot, across and above said register means.

10. The apparatus as recited in claim 1 further including a root cutting bed positioned at the end of said conveyor means to receive vegetables after top foliage has been removed, including a plurality of parallel bars, root cutting means positioned adjacent said bars, means for moving vegetables over said root cutting means, and means for orienting roots so as to fall between said bars for cutting by said root cutting means.

11. The apparatus as recited in claim 10 wherein said means for moving vegetables includes means for moving said bars across said bed.

12. The apparatus of claim 11 in which said means for orienting said vegetables comprises a plurality of depending fingers oscillating back and forth in a direction generally transverse of the direction of movement of said vegetable moving means whereby said fingers engage said vegetables and roll them from side to side to thereby cause the roots to fall between said bars.

13. The apparatus of claim 12 wherein said means for orienting said roots also comprises means for rotating said bars as they are moved across said bed whereby vegetables are continuously being turned until their roots fall between said bars.

14. The apparatus of claim 13 in which said fingers are made of a pliable, flexible material so as to avoid damaging vegetables.

15. The apparatus of claim 12 in which said fingers are made of a pliable, flexible material so as to avoid damaging vegetables.

16. The apparatus as recited in claim 13 wherein said bar movement means includes at least one endless drive chain extending around said bed, said bars being operatively connected to said chain so that driving said chain around said bed moves said bars around said bed to move said means across said bed.

17. The apparatus as recited in claim 16 wherein said bar rotation means includes a second chain positioned along said bed and gear means fixed to each of said bars and engaged with said second chain, said first and second chains being moved relative to one another, whereby translation of said bars across said bed causes rotation of said bars when said gears rotate on and travel along said second chain.

18. The apparatus as recited in claim 10 wherein said bars are stationary and are positioned at an acute angle with respect to the direction of travel of vegetables across said bed.

19. The apparatus as recited in claim 18 wherein said root cutting means includes a plurality of blades extending transversely across said bed above said bars and movable along said bed, and blade drive means for moving said blades along said bed, whereby said vegetable moving means comprise said blades.

20. The apparatus of claim 19 in which said means for orienting said vegetables comprises a plurality of depending fingers oscillating back and forth in a direction generally transverse of the direction of movement of said vegetable moving means whereby said fingers engage said vegetables and roll them from side to side to thereby cause the roots to fall between said bars.

21. The apparatus of claim 20 wherein said means for orienting said roots also comprises means for rotating said bars as they are moved across said bed whereby vegetables are continuously being turned until their appendage portions fall between said bars.

22. The apparatus as recited in claim 1 wherein said means for extracting and conveying vegetables includes two conveyor flights, at least a first flight of said conveyors being mounted on a frame which is pivotally secured to the front of said apparatus and extends toward the ground, said first flight including at least one digger chain which, when said frame is pivoted so its lower end contacts the ground, said digger chain will unearth vegetables, and convey said vegetables to said second conveyor flight, said cutting means being located above said second conveyor means.

23. The apparatus of claim 22 in which said first conveyor flight is short relative to the conveyor means and extends towards the ground at a relatively shallow angle to facilitate digging vegetables;

said second flight conveyor extending relatively steeply upwardly from a point generally adjacent the delivery end of said first flight conveyor whereby relatively large wheel means can be mounted on said apparatus directly behind said second flight conveyor means to facilitate easy movement of said apparatus over the ground.

24. The apparatus as recited in claim 23 which further includes means for automatically adjusting the depth of cut of said digger chain.

25. The apparatus as recited in claim 24 wherein said depth adjusting means includes a guide wheel and a guide wheel frame on which said guide wheel is mounted, said guide wheel frame being pivotally mounted on the front of said conveyor frame so that said guide wheel contacts the ground when said guide wheel frame is lowered, and means for detecting the relative angular displacement of said guide wheel frame on said conveyor frame in response to changes in ground contour; means connected to and responsive to said detecting means for adjusting the position of said conveyor frame accordingly.

26. The apparatus as recited in claim 25 wherein said detecting means includes a control rod connected to said guide wheel frame at one end and slidably connected to said conveyor frame at the other, and means for detecting the sliding of said detector rod relative to said conveyor frame and said depth adjusting means being responsive to said detecting means for adjusting the position of said conveyor frame accordingly.

27. The apparatus as recited in claim 26 wherein said control rod includes a cam; said detecting means including two spaced cam follower means located on said conveyor frame, and switch means associated with each of said cam followers, whereby the position of said cam with respect to each of said cam followers can be detected by said switch means, said switch means being connected to said adjusting means to adjust the position of said conveyor frame.

28. The apparatus as recited in claim 1 which further includes motive means for supporting and moving said harvester on and across a field, said extracting means and conveyor means being at least as wide as and extending forwardly of said motive means so that said motive means follows said extracting and conveying means, traveling on ground out of which vegetables have been extracted.

29. The apparatus as recited in claim 28 wherein said motive means includes traction means to support said harvester on soft ground.

30. The apparatus as recited in claim 29 wherein said traction means includes tires.

31. The apparatus of claim 1 in which said extracting means comprises a digger chain mounted on a pivotally mounted conveyor frame and means for automatically adjusting the depth of cut of said digger chain;

depth adjusting means including a guide wheel and a guide wheel frame on which said guide wheel is mounted, said guide wheel frame being pivotally mounted on the front of said conveyor frame so that said guide wheel contacts the ground when said guide wheel frame is lowered, and means for detecting the relative vertical angular displacement of said guide wheel frame on said conveyor frame in response to changes in ground contour;

means connected to and responsive to said detecting means for adjusting the position of said conveyor frame accordingly.

32. The apparatus as recited in claim 31 wherein said detecting means includes a detector rod connected to said guide wheel frame at one end and slidably connected to said conveyor frame at the other, and means for detecting the sliding of said detector rod relative to said conveyor frame and said depth adjusting means being responsive to said detecting means for adjusting the position of said conveyor frame accordingly.

33. The apparatus as recited in claim 32 wherein said detector rod includes a cam; said detection means including two spaced cam follower means located on said conveyor frame, and switch means associated with each of said cam followers, whereby the position of said cam with respect to each of said cam followers can be detected by said switch means, said switch means being connected to said depth adjusting means to adjust the position of said conveyor frame.

34. The apparatus of claim 1 in which vacuum means are used to generate said flow of air in said first and second air flow zones;

said vacuum means including a vacuum blower and a housing therefor, said housing including an inlet and an outlet;

said vacuum housing including a continuous conveyor extending from the interior surface thereof to said outlet and back again, whereby dirt and appendage cuttings not blown out by said blower are conveyed from the interior of said vacuum housing to the exterior thereof and are prevented from clogging said housing, outlet and blower.

35. The apparatus of claim 34 in which said conveyor extends from the interior of said housing to a point adjacent said housing outlet around to the exterior of said housing and then back into said housing at a point remote from said housing outlet.

36. The apparatus of claim 35 in which said conveyor extends from a first edge of said housing outlet, around said blower and back to an opposite edge of said housing outlet, and from thence to the exterior of said housing, around the exterior of said housing and back to said first edge of said inlet.

37. An apparatus for harvesting vegetables having appendages such as top foliage which can be blown erect by a flow of air, as for example onions, and which appendages must be removed, said apparatus comprising:

conveyor means comprising at least two conveyor flights, at least a first of said flights being mounted on a frame which is pivotally mounted at the front of the apparatus and extends toward the ground, said first flight including at least one digger chain which, when said frame is pivoted so its lower end contacts the ground, is adapted to unearth vegetables and convey said vegetables to a second flight, said first flight being short relative to said conveyor means and extending toward the ground at a relatively shallow angle to facilitate digging vegetables; said first flight beginning at a ground engaging digger end and continuing to a delivery end; said first flight conveyor including a delivery end adapted to unload objects carried on said conveyor;

said second flight extending relatively steeply upwardly from a point generally adjacent said delivery end of said first flight whereby vegetables conveyed to said second flight are elevated rapidly and relatively large wheel means can be mounted on said apparatus directly behind said second flight to facilitate easy movement of said apparatus over the ground;

motive means for supporting and moving said apparatus on and across a field; said first and second conveyor flights being at least as wide as and extending forwardly of said motive means so that said motive means follows said first and second conveyor flights on ground out of which vegetables have been extracted;

said conveyor means passing under an opening through which air continuously flows in first and second adjacent flow zones;

vacuum means to generate a continuous flow of air in said first and second air flow zones comprising a single source of vacuum for generating a flow of air both in said first air flow zone and in said second air flow zone, said flow of air in said second air flow zone being of sufficient force to lift vegetables off said conveyor means;

a deflector baffle positioned below said conveyor means at said first air flow zone to reduce the flow of air generated by said vacuum means and thereby prevent vegetables from being drawn upwardly off said conveyor means and through said first air flow zone, but allowing sufficient flow to cause the appendages to stand erect;

said first air flow zone being free of impediments for a distance sufficient to allow the appendages of the vegetables to stand erect;

register means located in said second air flow zone, said register means including bottom surfaces and openings opening toward the direction from which said conveyor means is traveling, and being at a level adapted to receive the erect appendages of the vegetable, whereby the erect appendages of vegetables on said conveyor means are received in said openings in said register means;

cutting means generally adjacent said register means for cutting said erect appendages of said vegetables when they are drawn by said vacuum means into contact with said bottom surfaces of register means whereby the appendages will be removed and said vegetables will fall back onto said conveyor means for conveyance away from said first and second air flow zones;

said vacuum means including a blower with an impeller and an impeller housing therefor, said housing including an inlet and an outlet;

said impeller housing including an endless conveyor belt substantially surrounding said impeller and the path of said belt extending from the interior of said housing to said outlet and back again, whereby dirt and appendage cuttings not blown out by said impeller are conveyed from the interior of said impeller housing to the exterior thereof and are prevented from clogging said housing, outlet and impeller.

38. The apparatus of claim 37 in which said cutting means comprises a plurality of knives mounted on means for conveying said knives, said means for conveying said knives being positioned adjacent said register means and being operably connected to knife drive means for driving said knife conveyor means and thereby said knives across said register means in one direction.

39. The apparatus as recited in claim 38 further including a root cutting bed positioned at the end of said conveyor means to receive vegetables after top foliage has been removed, including a plurality of parallel bars, root cutting means positioned adjacent said bars, means for moving vegetables over said root cutting means, and means for orienting roots so as to fall between said bars for cutting by said cutting means.

40. The apparatus as recited in claim 37 further including a root cutting bed positioned at the end of said conveyor means to receive vegetables after top foliage has been removed, including a plurality of parallel bars, root cutting means positioned adjacent said bars, means for moving vegetables over said root cutting means, and means for orienting roots so as to fall between said bars for cutting by said cutting means.

41. The apparatus of claim 40 in which said means for orienting said roots comprises a plurality of depending fingers oscillating back and forth in a direction generally transverse of the direction of movement of said vegetable moving means whereby said fingers engage said vegetables and roll them from side to side to thereby cause the roots to fall between said bars.

42. The apparatus as recited in claim 41 including depth adjusting means comprised of a guide wheel and a guide wheel frame on which said guide wheel is mounted, said guide wheel frame being pivotally mounted on the front of said conveyor frame so that said guide wheel contacts the ground when said guide wheel frame is lowered, and means for detecting the relative angular displacement of said guide wheel frame on said conveyor frame in response to changes in ground contour; means connected to and responsive to said detecting means for adjusting the position of said conveyor frame accordingly.

43. The apparatus as recited, in claim 37 including said depth adjusting means comprised of a guide wheel and a guide wheel frame on which said guide wheel is mounted, said guide wheel frame being pivotally mounted on the front of said conveyor frame so that said guide wheel contacts the ground when said guide wheel frame is lowered, and means for detecting the relative angular displacement of said guide wheel frame on said conveyor frame in response to changes in ground contour; means connected to and responsive to said detecting means for adjusting the position of said conveyor frame accordingly.

44. The apparatus as recited in claim 43 wherein said detecting means includes a detector rod connected to said guide wheel frame at one end and slidably connected to said conveyor frame at the other, and means for detecting the sliding of said detector rod relative to said conveyor frame and said depth adjusting means being responsive to said detecting means for adjusting the depth of said conveyor frame accordingly.

45. The apparatus as recited in claim 44 wherein said detector rod includes a cam; said detection means including two spaced cam follower means located on said conveyor frame, and switch means associated with each of said cam followers, whereby the position of said cam with respect to each of said cam followers can be detected by said switch means, said switch means being connected to said adjusting means to adjust the position of said conveyor frame.

46. An apparatus for removing appendages such as top foliage from vegetables, as for example onions, said apparatus comprising:

means for conveying vegatables under an opening through which air continuously flows in first and second adjacent air flow zones;

means for generating sufficient continuous air flow in said first air flow zone to cause the appendages of said vegetables to be blown upwardly into a generally erect condition;

said first air flow zone being free of impediments for a distance sufficient to allow the appendages of the vegetables to stand erect;

register means located in said second air flow zone, said register means including bottom surfaces and openings opening toward the direction from which said conveyor means is traveling, and being at a level adapted to receive the erect appendages of the vegetable, whereby the erect appendages of vegetables on said conveyor means are received in said openings in said register means;

means for generating an increased continuous air flow in said second air flow zone which is sufficient to lift said vegetables upwardly from said conveyor means and into contact with said bottom surfaces of said register means;

cutting means generally adjacent said register means for cutting said erect appendages of said vegetables when they are contact with said register means whereby the appendages will be removed and said vegetables will fall back onto said conveyor means for conveyance away from said first and second air flow zones.

47. The apparatus of claim 46 including vacuum means to generate said flow of air in said first and second air flow zones, whereby improved control of the vegetable appendages is maintained and dirt and foliage are drawn away from the vegetables.

48. The apparatus of claim 47 in which said vacuum means comprises a single source of vacuum for generating a flow of air both in said first air flow zone and in said second air flow zone;

said apparatus including a deflector baffle positioned below said conveyor means at said first air flow zone to reduce the flow of air generated by said vacuum means and thereby prevent vegetables from being drawn upwardly off said conveyor means and through said first air flow zone.

49. The apparatus of claim 48 in which said vacuum means includes a plenum having an opening above said conveyor means and encompassing said first and second air flow zones;
    said plenum including means for adjusting the size of said opening.

50. The apparatus of claim 49 in which said plenum includes means for adjusting the distance between the edge of said vacuum opening, along said first air flow zone, and said conveyor.

51. The apparatus as recited in claim 50 wherein said adjusting means includes a plenum baffle pivotably mounted on said plenum forming a portion of said plenum around said first opening portion, pivotably mounted so as to constrict or widen said first opening portion, and said baffle being extendable to adjust the distance between it and said conveyor.

52. The apparatus of claim 48 in which said cutting means comprises a plurality of knives mounted on means for conveying said knives, said means for conveying said knives being positioned adjacent said register means and being operably connected to knife drive means for driving said knife conveyor means and thereby moving said knives across said register means in one direction.

53. The apparatus of claim 52 in which said cutting means includes a track having a slot in which said knives travel, said slot being positioned immediately adjacent said register means, and a wedge-shaped shoe on the top of each knife and receivable in said slot as each knife passes through said slot, to thereby wedge each knife against said register means as it passes thereover.

54. The apparatus of claim 53 in which said cutting includes an elongated support extending transversely across and above said conveyor means, said support including said slot and track means, said knife conveyor means comprising an endless drive chain extending around said support, said knives being attached to said endless drive chain, whereby movement of said chain around said support moves said knives through said slot and across said register means.

55. An apparatus for removing appendages from vegetables, such as onions with roots and the like, comprising:
    an appendage cutting bed including a plurality of generally parallel bars movable together in a common direction and oriented generally transversely to their direction of movement; appendage cutting means positioned adjacent said bars; means for moving said bars across said appendage cutting means; a plurality of depending fingers oscillating back and forth in a direction generally transverse to the direction of movement of said parallel bars whereby said fingers engage the vegetables and roll them from side to side to thereby cause the roots to fall between said bars; and means for rotating said bars as they are moved across said bed whereby vegetables are continuously being turned until their appendages fall between said bars.

56. The apparatus of claim 55 in which said fingers are made of a pliable, flexible material so as to avoid damaging vegetables.

57. The apparatus as recited in claim 55 wherein said bar rotation means includes a second chain positioned along said bed and gear means fixed to each of said bars and engaged with said second chain, said first and second chains being moved relative to one another, whereby translation of said bars across said bed causes rotation of said bars when said gears rotate on and travel along said second chain.

58. An apparatus in which vacuum means are used to draw a flow of air past harvested vegetables or the like such that dirt or offal are likely to be drawn into the vacuum, said vacuum means including an impeller and a housing therefor, said housing including an inlet and an outlet, the improvement comprising:
    said impeller housing including an endless conveyor belt substantially surrounding said impeller and the path of said belt extending around the periphery of said impeller on the interior surface of said housing, said conveyor extending from said interior surface of said housing to said outlet, around the exterior of said housing and back into said interior of said housing, whereby dirt and appendage cuttings not blown out by said impeller are conveyed from said interior of said housing to said exterior thereof and are prevented from clogging said housing, outlet and impeller.

59. A process for topping vegetables having appendages such as top foliage to be cut from the vegetable, including:
    providing an opening through which air can flow, said opening being sufficiently large that a plurality of said vegetables can be moved across said opening simultaneously;
    moving the vegetables in a direction of travel past said opening;
    providing a continuous flow of air through said opening through a first air flow zone beginning where vegetables first enter said opening and a second air flow zone after said first air flow zone in the direction of travel of said vegetables;
    creating in said first air flow zone a first continuous current of air having a velocity sufficient to cause said appendages to be blown into a position generally parallel to said first current;
    creating in said second air flow zone a second continuous current of air adjacent and parallel to said first current, said second current having a velocity sufficient to lift said vegetables;
    positioning cutting means in the path of said second current and moving said vegetables through said first and second currents, whereby said first current will cause said apppendages to stand erect and second current will move said vegetables against said cutting means which will cut the foliage oriented parallel to said second current by said first current.

60. The process as recited in claim 59 which further includes positioning register means in the path of said second current adjacent said cutting means, said register means having openings oriented to receive said appendages as said vegetables are moved through said second current; and
    moving said cutting means adjacent said register means to sever said appendages in said openings.

61. The process as recited in claim 59 further including creating said two currents with a common vacuum means positioned on one side of the path of travel of said vegetables through said two currents; and
    reducing the velocity of said first current by positioning a baffle along said path so that the suction of said common vacuum across said first zone is less than the suction across said second zone.

62. The process as recited in claim 61 further including drawing said vacuum through a plenum having an opening positioned on said one side of said path, and providing means for adjusting the size of said opening to control the velocity of air across said two air flow zones.

* * * * *

UNITED STATES PATENT AND TRADEMARK OFFICE
CERTIFICATE OF CORRECTION

PATENT NO. : 4,753,296

DATED : June 28, 1988

INVENTOR(S) : David M. Kruithoff

It is certified that error appears in the above-identified patent and that said Letters Patent is hereby corrected as shown below:

Column 1, line 24:

Delete "harvest- ing" and insert --harvesting--.

Column 5, line 21:

After "diameter" insert --.--.

Column 7, line 49:

After "elevator" insert --chains--.

Column 7, line 53:

Delete "an" and insert --and--.

Column 7, line 64:

Delete "across-" and insert --across--.

Column 8, line 50:

Delete "conunction" and insert --conjunction--.

Column 8, line 50:

After "baffle 122" insert --(later described)--.

Column 12, line 46:

Delete "conveyo" and insert --conveyor--.

UNITED STATES PATENT AND TRADEMARK OFFICE
CERTIFICATE OF CORRECTION

PATENT NO. : 4,753,296

DATED : June 28, 1988

INVENTOR(S) : David M. Kruithoff

It is certified that error appears in the above-identified patent and that said Letters Patent is hereby corrected as shown below:

Column 13, line 6:

Delete "pivotably" and insert --pivotable--.

Column 13, line 11:

Delete "pivotably" and insert --pivotable--.

Column 13, line 13:

Delete "pivotal" and insert --pivotable--.

Column 13, line 14:

Delete "pivotal" and insert --pivotable--.

Column 13, line 28:

After "242" insert --is--.

Column 13, line 29:

Delete "pivotably" and insert --pivotable--.

Column 13, line 31:

Delete "pivotal" and insert --pivotable--.

Column 18, line 68:

Delete "severe" and insert --sever--.

UNITED STATES PATENT AND TRADEMARK OFFICE
CERTIFICATE OF CORRECTION

PATENT NO. : 4,753,296
DATED : June 28, 1988
INVENTOR(S) : David M. Kruithoff

It is certified that error appears in the above-identified patent and that said Letters Patent is hereby corrected as shown below:

Column 19, line 31:

Delete "severe" and insert --sever--.

Column 21, claim 9, line 1:

After "cutting" insert --means--.

Column 22, claim 27, line 60:

After "connected to said" insert --depth--.

Column 26, claim 46, line 48:

After "they are" insert --in--.

Signed and Sealed this

Twentieth Day of December, 1988

Attest:

DONALD J. QUIGG

*Attesting Officer*　　　　Commissioner of Patents and Trademarks